US011558272B2

(12) United States Patent
Ranjan et al.

(10) Patent No.: US 11,558,272 B2
(45) Date of Patent: Jan. 17, 2023

(54) METHODS AND SYSTEMS FOR PREDICTING TIME OF SERVER FAILURE USING SERVER LOGS AND TIME-SERIES DATA

(71) Applicant: MASTERCARD INTERNATIONAL INCORPORATED, Purchase, NY (US)

(72) Inventors: Rajesh Kumar Ranjan, Madhubani (IN); Karamjit Singh, Gurgaon (IN); Sangam Verma, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/476,201

(22) Filed: Sep. 15, 2021

(65) Prior Publication Data
US 2022/0103444 A1    Mar. 31, 2022

(30) Foreign Application Priority Data
Sep. 30, 2020 (IN) .............................. 202041042512

(51) Int. Cl.
*G06F 15/16* (2006.01)
*H04L 43/067* (2022.01)
(Continued)

(52) U.S. Cl.
CPC ........... *H04L 43/067* (2013.01); *G06N 20/00* (2019.01); *H04L 43/065* (2013.01); *H04L 43/106* (2013.01)

(58) Field of Classification Search
CPC .... H04L 43/067; H04L 43/065; H04L 43/106
(Continued)

(56) References Cited

U.S. PATENT DOCUMENTS 9,053,216 B1 * 6/2015 Coleman ............... G06F 11/079
9,323,638 B2 * 4/2016 Coleman ............. G06F 11/1484
(Continued)

FOREIGN PATENT DOCUMENTS

WO    2021/118526 A1    6/2021

OTHER PUBLICATIONS

Zuo, Y et al., An Intelligent Anomaly Detection Scheme for Micro-Services Architectures With Temporal and Spatial Data Analysis, IEEE Transactions on Cognitive Communications and Networking, Jan. 2020.
(Continued)

*Primary Examiner* — Moustafa M Meky
(74) *Attorney, Agent, or Firm* — Pillsbury Winthrop Shaw Pittman LLP

(57) ABSTRACT

The disclosure relates to methods and systems for predicting time of occurrence of future server failures using server logs and a stream of numeric time-series data occurred with a particular time window. Method performed by processor includes accessing plurality of server logs and stream of numeric time-series data, applying density and sequential machine learning model over plurality of server logs for obtaining first and second outputs, respectively, applying a stochastic recurrent neural network model over the stream of time-series data to obtain third output. The method includes aggregating first, second, and third outputs using an ensemble model, predicting likelihood of at least one future server anomaly based on the aggregating, and determining time of occurrence of the at least one future server anomaly by capturing server behavior characteristics using time-series network model. The server behavior characteristics include time-series patterns of the stream of numeric time-series data.

20 Claims, 14 Drawing Sheets

(51) Int. Cl.
  *G06N 20/00*    (2019.01)
  *H04L 43/065*   (2022.01)
  *H04L 43/106*   (2022.01)

(58) Field of Classification Search
  USPC .......................................................... 709/224
  See application file for complete search history.

(56) References Cited

U.S. PATENT DOCUMENTS

| | | | |
|---|---|---|---|
| 9,836,347 B2* | 12/2017 | McChord | G06F 11/301 |
| 2011/0038467 A1* | 2/2011 | Jin | H04M 3/36 |
| | | | 379/88.17 |
| 2016/0350169 A1* | 12/2016 | McChord | G06F 11/324 |
| 2018/0219894 A1* | 8/2018 | Crabtree | H04L 63/20 |
| 2020/0126037 A1* | 4/2020 | Tatituri | G06N 20/10 |
| 2020/0151259 A1* | 5/2020 | Smith | G06N 3/006 |

OTHER PUBLICATIONS

Lukas, R et al., A Unifying Review of Deep and Shallow Anomaly Detection, ArXiv.org, Sep. 2020.
Alla, S et al., Beginning Anomaly Detection Using Python-Based Deep Learning, apress, Oct. 2019.
Extended European Search Report issued in corresponding International Application No. 21194594.4, dated Feb. 2022.

* cited by examiner

METHODS AND SYSTEMS FOR PREDICTING TIME OF SERVER FAILURE USING SERVER LOGS AND TIME-SERIES DATA

RELATED APPLICATIONS

This application claims priority to Indian Application Serial No. 202041042512, filed Sep. 30, 2020, which is incorporated herein by reference in its entirety.

TECHNICAL FIELD

The present disclosure relates to artificial intelligence processing systems and, more particularly to, electronic methods and complex processing systems for predicting time of occurrence of future server failures using server logs and numeric time-series data associated with a server by utilizing machine learning techniques.

BACKGROUND

Most enterprise applications are organized as high-level workflows that incorporate at least one phase of associations between client devices and at least one data center server. For instance, a payment workflow can incorporate a phase for handling payment exchanges received from acquirer servers, which continues to an authorization stage for checking information received in a payment request, which at that point continues to the last checkout stage for sending the payment request to issuer servers for approval. The exchange of information in the various stages of the workflows is usually handled by computing components associated with a server. Such computing components may include hardware resources (e.g., computing devices, switches, etc.) and software resources (e.g., database applications). These resources may be used to collect and store data at various times related to a variety of measurable properties, including network, hardware, or database performance properties measured at different times.

Each computing component generates fault codes to the operations and activities performed by the server, known as server logs. The severity of the fault codes may vary from 'info' to 'critical'. Based on the severity, the server takes action to minimize the chances of server failure. In one example, server failure may occur due to, but not limited to, virus attack, physical disaster, human error, hardware/software failure, human error, failed upgrade/update, etc.

In existing frameworks, server failures are identified manually on a receptive basis using related server logs which results in a loss in both business and manual effort. Further, existing ways to deal with the computerized server failure prediction process includes fitting a likelihood distribution on normal logs (i.e., "healthy log data") and grouping logs as anomalies that deviate from the likelihood appropriation. Also, the conventional statistical methodologies for server failure prediction give false positives because of complexity in the logs, the structure of the logs. False server failure prediction may lead to false reporting, which may desensitize users to anomaly reports and/or lead to unnecessary maintenance or remedial operations being performed.

Additionally, the existing frameworks are not able to detect server failure time before its occurrence, so that immediate action cannot be taken to minimize huge losses of data and many other important computing resources.

Thus, there is a need for a technical solution for predicting server failures and time of server failures well before their occurrences using automated means to an unprecedented manner/degree, through the use of artificial intelligence and machine learning.

SUMMARY

Various embodiments of the present disclosure provide systems, methods, electronic devices and computer program products for predicting time of future server failures using server logs and a stream of numeric time-series data occurred with a particular time window.

In an embodiment, a computer-implemented method is disclosed. The computer-implemented method performed by a processor includes accessing a plurality of server logs and a stream of numeric time-series data associated with a server for a particular time window. The computer-implemented method includes applying a density machine learning model over the plurality of server logs for obtaining a first output. The density machine learning model is trained based, at least in part, on normal log data associated with the server. The computer-implemented method includes applying a sequential machine learning model over the plurality of server logs for obtaining a second output. The sequential machine learning model is trained based, at least in part, on normal log data associated with the server. The computer-implemented method includes applying a stochastic recurrent neural network model over the stream of the numeric time-series data for obtaining a third output. The stochastic recurrent neural network model is trained based, at least in part, on normal time-series data associated with the server. The computer-implemented method further includes aggregating the first, second, and third outputs corresponding to the density machine learning model, sequential machine learning model, and the stochastic recurrent neural network model based, at least in part, on an ensemble model. The computer-implemented method further includes predicting a likelihood of at least one future server anomaly based, at least in part, on the aggregating. The computer-implemented method includes determining a time of occurrence of the at least one future server anomaly by capturing server behavior characteristics using time-series network model. The server behavior characteristics includes time-series patterns of the stream of numeric time-series data.

In another embodiment, an anomaly time prediction system is disclosed. The anomaly time prediction system includes a communication interface, a memory including executable instructions, and a processor communicably coupled to the communication interface. The processor is configured to execute the executable instructions to cause the anomaly time prediction system to at least access a plurality of server logs and a stream of numeric time-series data associated with a server for a particular time window and apply a density machine learning model over the plurality of server logs for obtaining a first output. The density machine learning model is trained based, at least in part, on normal log data associated with the server. The anomaly time prediction system is further caused to apply a sequential machine learning model over the plurality of server logs for obtaining a second output and apply a stochastic recurrent neural network model over the stream of the numeric time-series data for obtaining a third output. The sequential machine learning model is trained based, at least in part, on normal log data associated with the server. The stochastic recurrent neural network model is trained based, at least in part, on normal time-series data associated with the server.

The anomaly time prediction system is further caused to aggregate the first, second, and third outputs corresponding to the density machine learning model, the sequential machine learning model, and the stochastic recurrent neural network model based, at least in part, on an ensemble model. The anomaly time prediction system is further caused to predict a likelihood of at least one future server anomaly based, at least in part, on the aggregating and determine a time of occurrence of the at least one future server anomaly by capturing server behavior characteristics using time-series network model. The server behavior characteristics includes time-series patterns of the stream of numeric time-series data.

In yet another embodiment, a computer-implemented method for predicting time of server failure is disclosed. The computer-implemented method performed by a processor includes accessing a plurality of server logs and a stream of numeric time-series data associated with a server for a particular time window. The stream of numeric time-series data represents performance metrics associated with the server recorded within the particular time window. The computer-implemented method includes applying a density machine learning model over the plurality of server logs for obtaining a first output and applying a sequential machine learning model over the plurality of server logs for obtaining a second output. The density machine learning model is trained based, at least in part, on normal log data associated with the server. The sequential machine learning model is trained based, at least in part, on the normal log data associated with the server. The computer-implemented method includes applying a stochastic recurrent neural network model over the stream of the numeric time-series data for obtaining a third output. The stochastic recurrent neural network model is trained based, at least in part, on normal time-series data associated with the server. The computer-implemented method further includes aggregating the first, second, and third outputs corresponding to the density machine learning model, sequential machine learning model, and the stochastic recurrent neural network model based, at least in part, on an ensemble model. The computer-implemented method further includes predicting a likelihood of at least one future server anomaly based, at least in part, on the aggregating. The computer-implemented method includes determining a time of occurrence of the at least one future server anomaly by capturing server behavior characteristics using time-series network model. The server behavior characteristics includes time-series patterns of the stream of numeric time-series data. The time-series network model is trained based, at least in part, on abnormal time-series data associated with the server.

BRIEF DESCRIPTION OF THE FIGURES

For a more complete understanding of example embodiments of the present technology, reference is now made to the following descriptions taken in connection with the accompanying drawings in which.

Figure 1:
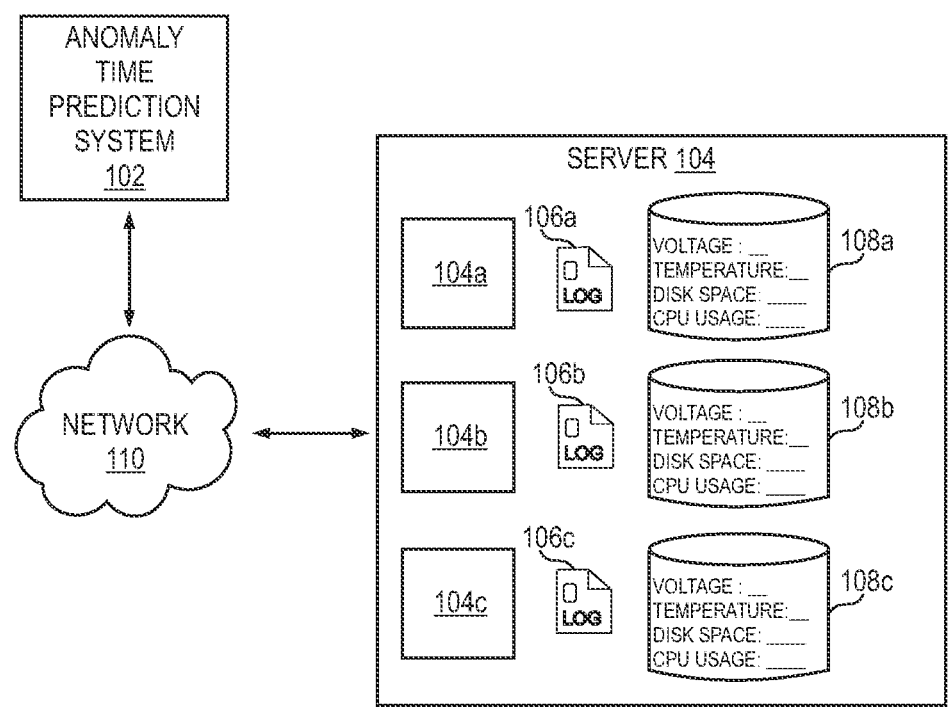
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

OVERVIEW

Various example embodiments of the present disclosure provide methods, systems, user devices and computer program products for predicting the time of future server failures proactively using server logs and a stream of numeric time-series data and providing alert notifications to administrators for preventing future server failures even before the failure would occur. These advanced and timely server failure warnings permit preventive actions (e.g., isolation, backup, migration) to minimize failure impacts on running servers. Moreover, with time prediction of server failures, preventive actions are taken only on abnormal devices or factors on the server to greatly reduce fault tolerance cost.

In various example embodiments, the present disclosure describes an anomaly time prediction system that facilitates prediction of server failures and time of occurrence of the predicted server failures well before their occurrence. The anomaly time prediction system includes at least a processor and a memory. The processor is configured to receive a plurality of server logs and a stream of numerical time-series data from a server periodically. In an example, each server log may include, but not limited to, various fields such as time of occurrence, server severity rating, server fault code, device details, frequency of occurrences, etc. The stream of numeric time-series data represents performance metrics (such as, voltage, temperature, disk space usage, memory outage, CPU usage, etc.) associated with the server. The processor is configured to access a plurality of server logs and the stream of numeric time-series data associated with the server for a particular time window (e.g., 3 hours) and perform pre-processing over the plurality of server logs and the stream of numeric time-series data for the particular time window. The processor is configured to convert the plurality of server logs into corresponding vector representations.

In one embodiment, the processor is configured to apply a density machine learning model over the plurality of server logs for obtaining a first output. The density machine learning model is trained based, at least in part, on normal log data associated with the server. In one example, the density machine learning model is implemented using a stacked auto encoder. In particular, the processor is configured to provide an input vector associated with the plurality of server logs to the density machine learning model. A value for each index of the input vector represents a frequency of occurrences of a plurality of server fault codes within the particular time window. The processor is configured to apply a sequential machine learning model over the plurality of server fault codes for obtaining a second output. The sequential machine learning model is trained based, at least in part, on normal log data associated with the server. In one example, the sequential machine learning model is implemented using a Long Short Term Memory (LSTM) based sequential auto encoder.

In one embodiment, the processor is configured to apply a stochastic recurrent neural network (SRNN) model over the stream of the numeric time-series data for obtaining a third output. The stochastic recurrent neural network model is trained based, at least in part, on normal time-series data associated with the server. In one embodiment, the network architecture of the stochastic recurrent neural network model includes, but is not limited to, gated recurrent units, variational auto encoder, and planar normalizing flows (NF) architecture. In particular, the processor is configured to determine temporal dependency between the stream of numeric time-series data using the gated recurrent units by generating hidden variables corresponding to the stream of numeric time-series data and map the stream of numeric time-series data to stochastic variables in a latent space using the variational auto encoder. Further, the processor is configured to generate a probability distribution of the stochastic variables in the latent space using the planar NF architecture.

Thereafter, the processor is configured to reconstruct the stream of numeric time-series data based, at least in part, on the probability distribution of the stochastic variables in the latent space and determine whether the stream of numeric time-series data occurred within the particular time window has anomalous behavior or not based, at least in part, on the reconstruction. The processor is configured to generate the third output based, at least in part, on the determination.

In one embodiment, the processor is configured to aggregate the first, second, and third outputs corresponding to the density machine learning model, the sequential machine learning model, and the stochastic recurrent neural network (SRNN) model based, at least in part, on an ensemble model. Based on the aggregated output, the processor is configured to predict a likelihood of at least one future server anomaly.

When the processor predicts the at least one future server anomaly, the processor is configured to determine a time of occurrence of the at least one future server anomaly by capturing server behavior characteristics using a time-series network model. The server behavior characteristics include time-series patterns of the stream of numeric time-series data and density and sequential patterns of the plurality of server logs. The time-series network model is trained based, at least in part, on abnormal time-series data associated with the server. In one example, the time-series network model is Long and Short-term Time-series network (LSTNet) model. The time-series network model is implemented using a convolutional neural network layer, a recurrent neural network layer, and an autoregressive layer.

Then, the processor is configured to send an alert to an administrator about the time of future server failure occurrences for taking preventive actions.

Various embodiments of the present disclosure offer multiple advantages and technical effects. For instance, the present disclosure provides an anomaly time prediction system for predicting the time of future server failures which can be used to take pre-emptive actions. The anomaly time prediction system is able to detect log sequence anomalies, the log occurrence deviation anomalies and time series data anomalies. The anomaly time prediction system utilizes a plurality of machine learning (ML) models to detect the server anomalies and predict the time of occurrence of future server failures that provide other further technical advantages.

For example, the SRNN model captures the normal patterns of multivariate time-series data by learning their robust representations. The SRNN model also captures temporal dependence between the multivariate time series data which enhances the process accuracy of dealing with time-series data. In addition, utilizing an ensemble model of the machine learning models provides more accurate predictions and reduces false alerts of server failures.

Further, a time-series network model is also utilized for facilitating time-series forecasting of the multivariate time-series data. The time-series network model is advantageous as it captures both local dependencies and complex long-term dependencies among the multivariate time-series data.

Additionally, the present disclosure provides significantly more robust solutions because of handling simultaneous/concurrent processor execution (such as applying one or more machine learning models over the same input, simultaneously). Even further, the present disclosure improves the operations of servers because, by performing these synergistic operations to detect server anomalies and predict the time of occurrence of the future server failures, the servers will be less exposed to prolonged attacks and will be provided enhanced protections.

Various example embodiments of the present disclosure are described hereinafter with reference to FIGS. 1 to 11.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, predicting server failures proactively, etc. The environment 100 generally includes an anomaly time prediction system 102, a plurality of servers 104a, 104b, 104c, each coupled to, and in communication with (and/or with access to) a network 110. The network 110 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 110 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 110 may include multiple different networks, such as a private network made accessible by the plurality of servers 104a, 104b, 104c, separately, and a public network (e.g., the Internet etc.) through which the plurality of servers 104a, 104b, 104c and the anomaly time prediction system 102 may communicate. The plurality of servers 104a, 104b, and 104c hereinafter is collectively represented as "the server 104".

The server 104 may be, but is not limited to, network servers, data storage servers, web servers, interface/gateway servers, application servers, a cloud server, and virtual servers, etc. In one embodiment, the server 104 includes one or more blade servers together with a blade chassis including common resources such as networking connections, input/output device connections, power connections, cooling devices, switches, etc. The server 104 can also be a component of a larger system, such as a data center that centralizes enterprise computing resources.

The server 104 includes at least one log file (e.g., log file 106a, 106b, or 106c), which is created and maintained by the server 104 in the form of text files. Each server log includes a plurality of data fields such as, timestamp, computing component or device details, server fault code, a server severity rating, a number of occurrences of the server logs within a particular time interval, etc. In one non-limiting example, the server 104 may be a data storage server recording server fault codes in a log file. The log file contains a plurality of logs with heterogeneous textual data including information of activities performed by the data storage server.

Each server may store a set of numeric time-series data associated with the hardware and software components of the server in a time-series database (e.g., time-series database 108a, time-series database 108b, or time-series database 108c). The numeric time-series data may include, but not limited to, voltage, temperature, disk space usage, memory outage, CPU usage etc. The time-series data is captured in an order of time and is a set of numerical data that contributes to the performance of the server 104.

The anomaly time prediction system 102 includes a processor and a memory. The anomaly time prediction system 102 is configured to perform one or more of the operations described herein. In general, the anomaly time prediction system 102 is configured to determine a likelihood of occurrence of future server failure events as well as the time of the occurrence of the future server failure. In a more illustrative manner, the anomaly time prediction system 102 facilitates the detection of server anomalies and the time of the occurrence of the server anomalies in a proactive manner. In one embodiment, the anomaly time prediction system 102 is a separate part of the environment 100, and may operate apart from (but still in communication with, for example, via the network 110) the plurality of servers 104a, 104b, 104c, (and access data to perform the various operations described herein). However, in other embodiments, the anomaly time prediction system 102 may actually be incorporated, in whole or in part, into one or more parts of the environment 100. In addition, the anomaly time prediction system 102 should be understood to be embodied in at least one computing device in communication with the network 110, which may be specifically configured, via executable instructions, to perform as described herein, and/or embodied in at least one non-transitory computer-readable media.

The anomaly time prediction system 102 utilizes an ensemble method of machine learning models which may detect different kind of anomalous behaviors of the server 104 and predict the time of occurrence of the anomalies based on periodic server fault codes present in the server and a stream of numeric time-series data. In one example, a machine learning model is configured to detect a server anomaly if a particular group of server logs occurs more or less than a particular count within a specific time window. In another example, a machine learning model is configured to detect a server anomaly if a particular log sequence does not occur as expected within the specified timeframe. In yet another example, a machine learning model is configured to detect a server anomaly based on the stream of numeric time-series data. Based on the above anomaly detection, the anomaly time prediction system 102 predicts future server anomalies. Further, in an example, a machine learning model is configured to predict the time of occurrence of the future server anomalies/failures based on the anomalous server logs detected by the machine learning models and the stream of numeric time-series data associated with those server logs which was found to be anomalous and sends alert to the administrators.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG.

1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
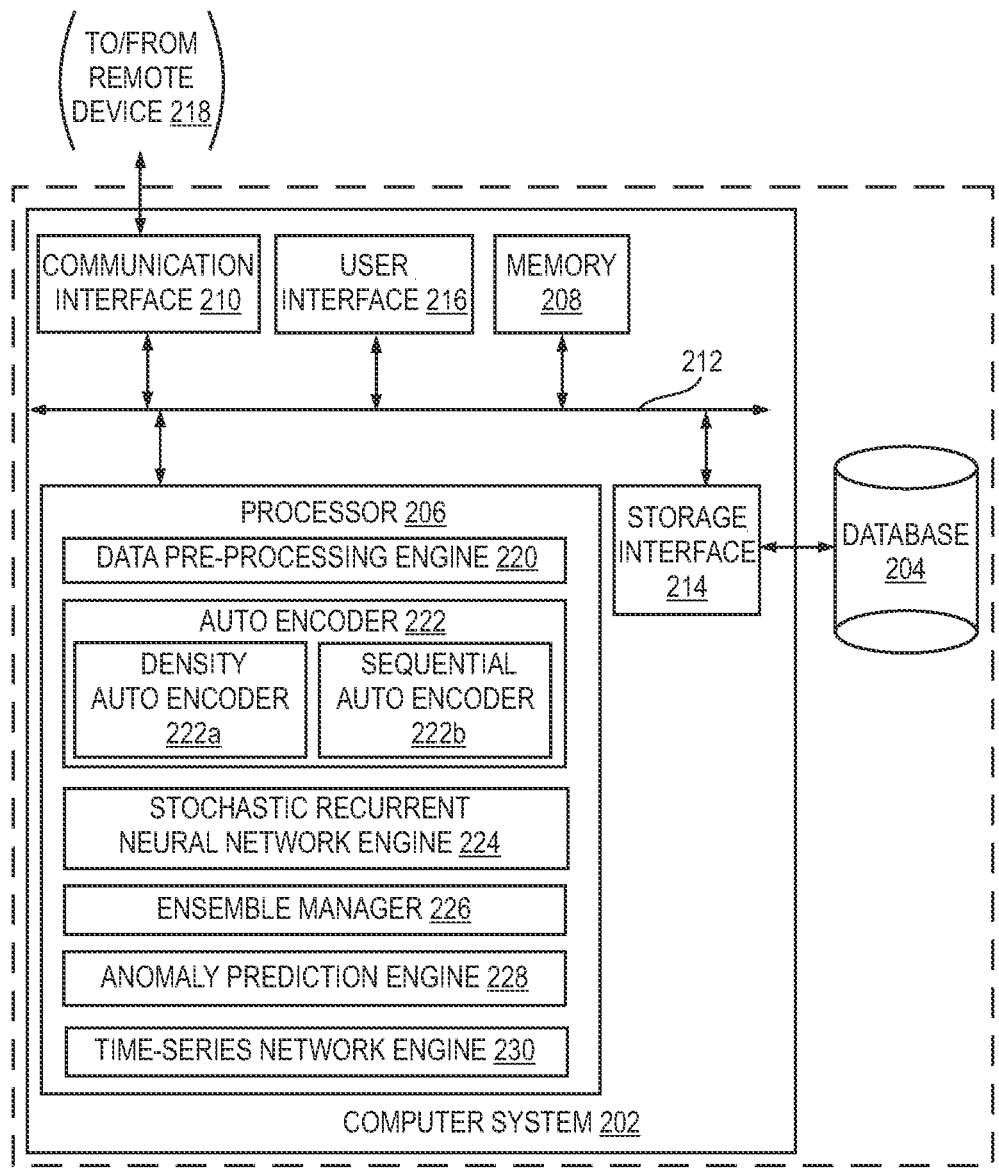
FIG. 2 is a simplified block diagram of an anomaly time prediction system, in accordance with one embodiment of the present disclosure.

Referring now to FIG. 2, a simplified block diagram of an anomaly time prediction system 200, is shown, in accordance with an embodiment of the present disclosure. The anomaly time prediction system 200 is similar to the anomaly time prediction system 102. In some embodiments, the anomaly time prediction system 200 is embodied as a cloud-based and/or SaaS-based (software as a service) architecture. In some embodiments, the anomaly time prediction system 200 may be implemented in a server system.

The anomaly time prediction system 200 includes a computer system 202 and a database 204. The computer system 202 includes at least one processor 206 for executing instructions, a memory 208, a communication interface 210, and a user interface 216 that communicate with each other via a bus 212.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In one embodiment, the database 204 is configured to store one or more trained machine learning models (e.g., density machine learning model, sequential machine learning model, stochastic recurrent neural network model, and time-series network model).

The processor 206 includes suitable logic, circuitry, and/or interfaces to execute operations for receiving various server logs from the server 104. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the anomaly time prediction system 200, as described herein. In another embodiment, the memory 208 may be realized in the form of a database server or cloud storage working in conjunction with the anomaly time prediction system 200, without departing from the scope of the present disclosure.

The processor 206 is operatively coupled to the communication interface 210 such that the processor 206 is capable of communicating with a remote device 218 such as, the server 104, or communicated with any entity connected to the network 110 (as shown in FIG. 1). Further, the processor 206 is operatively coupled to the user interface 216 for interacting with regulators/analysts who are responsible for preventing server failures.

It is noted that the anomaly time prediction system 200 as illustrated and hereinafter described is merely illustrative of an apparatus that could benefit from embodiments of the present disclosure and, therefore, should not be taken to limit the scope of the present disclosure. It is noted that the anomaly time prediction system 200 may include fewer or more components than those depicted in FIG. 2.

In one embodiment, the processor 206 includes a data pre-processing engine 220, an auto encoder 222 (including a density auto encoder 222a and a sequential auto encoder 222b), a stochastic recurrent neural network engine 224, an ensemble manager 226, an anomaly prediction engine 228 and a time-series network engine 230.

The data pre-processing engine 220 includes suitable logic and/or interfaces for receiving server logs and a stream of numeric time-series data from the server 104. In one embodiment, the data pre-processing engine 220 may facilitate aggregation of all the server logs and the stream of numeric time-series data received within a particular time window (for example, three hours).

The data pre-processing engine 220 is configured to parse each server log into a corresponding structured data sequence. Each server log may include, but not limited to, data fields such as time of occurrence, device details, server fault code, server severity rating, log identifier, a frequency of occurrences within the particular time window etc. In one example, to parse the server log, each piece of alphanumeric data within the server log is separated into numeric sequences using a defined set of delimiters (e.g., spaces, equal signs, colons, semicolons, etc.). Each structured data sequence is configured to include a server fault code extracted from its corresponding server log. The server fault code (e.g., "F1256") represents a type of server failure. In one embodiment, the data pre-processing engine 220 is configured to interpret the server logs and filter out noise, (i.e., irrelevant data) and extract predictive features.

The data pre-processing engine 220 is configured to extract the frequency of occurrence of a server fault code during the particular time window from each server log. In one embodiment, features like minimum frequency of occurrences, maximum frequency of occurrences, average frequency of occurrences, and standard deviation of frequency of occurrences associated with each distinct server fault codes may also be determined by the data pre-processing engine 220.

It should be noted that the server logs are "heterogeneous," which is used herein to denote that the logs may be generated by servers that may have been written in different programming languages and with different logging styles, producing server logs that have different structures and semantics.

The data pre-processing engine 220 is configured to transform the stream of numeric time-series data belonging to the particular time window into vector representations using standardizing techniques. The stream of numeric time-series data represents performance metrics associated with the server recorded within the particular time window. The numeric time-series data may include dynamic numerical features (e.g., CPU usage, memory usage, Network usage, temperature, etc.) acquired at various times within the particular time window from the time-series database (e.g., "time-series database 108a"). Thereafter, the data pre-processing engine 220 is configured to perform segmentation over the standardized numeric time-series data and sequence the same for easier processing in later operations. In one example, segmentation involves generating subsequences from the streams of numeric time-series data. The data pre-processing engine 220 utilizes sliding window methods to segment the stream of numeric time-series data into sequences. In other words, sliding window methods are utilized for the temporal approximation of actual values of the stream of numeric time-series data. In one example, the stream of numeric time-series is defined as:

$x=\{x_1, x_2, \ldots, x_N\}$, where N represents a number of time-series numerical features. Each time-series data is represented in form of vectors (i.e., M dimensional vector).

Additionally, the data pre-processing engine 220 is configured to determine the minimum, maximum, average and standard deviation values of the dynamic numerical features such as temperature, voltage, etc.

After data pre-processing, the server logs in form of the distinct server fault codes are provided to the auto encoder 222 and the stream of numeric time-series data is provided to the stochastic recurrent neural network engine 224 for anomaly detection.

The auto encoder 222 includes a density auto encoder 222a and a sequential auto encoder 222b. The auto encoder 222 is trained based on normal log data (i.e., "healthy server logs") and configured to detect anomalies if the server logs appear to be unhealthy (anomalous).

The density auto encoder 222a includes suitable logic and/or interfaces for training a density machine learning model based at least on normal log data, which corresponds to normal operations at all the computing components of the server 104. The "normal server logs" represent server logs that occur when all the computing components of the server 104 are working properly. In one example, the normal server logs are identified based on server severity rating. In one example, the server severity rating may be 'cleared', 'condition', 'critical', 'info', 'major', 'minor', 'warning'. The server fault code represents a failure in the server 104 for which an alarm may be raised when the server severity rating goes to a critical level. The server fault codes associated server severity ratings such as, 'info', 'minor', etc. are considered the normal server logs. The density machine learning model may be, but not limited to, a self-supervised machine learning model which is utilized for representation learning of an input data. In one non-limiting example, the density auto encoder 222a may be a stacked auto encoder including multiple encoder layers and decoder layers. The density auto encoder 222a as the stacked auto encoder is explained with reference to FIG. 4.

In one embodiment, the density auto encoder 222a is fed with an input vector representing a frequency of occurrences of distinct server fault codes during the particular time window (e.g., 3 hours). The length of the input vector is equal to a number of the distinct server fault codes and a value for each index value of the input vector depicts a frequency of appearances of each distinct server fault code during the particular time window (e.g., 3 hours). In other words, the input vector has information of the number of occurrences of each distinct server fault code during the particular time window. In one embodiment, the input vector may be generated based at least on the features like minimum frequency of occurrences, maximum frequency of occurrences, average frequency of occurrences, and standard deviation of frequency of occurrences associated with all the distinct server fault codes.

The density auto encoder 222a learns a representation learning of the input vector and tries to reconstruct the same input vector as an output. To the extent the reconstructed output from the density auto encoder 222a differs from the original input vector, various training techniques, (such as, back propagation, stochastic gradient descent, etc.,) may be employed to adjust various weights associated with the density auto encoder 222a to reduce the reconstruction error and train the density auto encoder 222a.

In one embodiment, the density auto encoder 222a uses a loss function for reducing the reconstruction error by adjusting various weights associated with the density auto encoder 222a. In one example, the loss function is Log-Cosh loss function.

During the execution phase, the density auto encoder 222a, after being trained/fine-tuned, is fed with an input vector including information of a frequency of occurrences of newly-arrived server logs (i.e., server fault codes) on a timely basis. Consequently, the density auto encoder 222a generates an output which represents a reconstruction probability of particular newly-arrived server logs. If the reconstruction probability associated with particular newly-arrived server logs is low, the particular newly-arrived server logs are considered to have an anomaly and are marked as being "abnormal." If the reconstruction probability associated with the particular newly-arrived server logs is high, the particular newly-arrived server logs are considered to be normal server logs. Hence, in the execution phase, the density auto encoder 222a is configured to determine deviations of server logs (i.e., server fault code) occurrences within the particular time window.

The sequential auto encoder 222b includes suitable logic and/or interfaces for training a sequential machine learning model by taking a time-based sequence of the normal server logs that occurred during the particular time window (e.g., 3 hours) as an input. The sequential auto encoder 222b is a neural network machine translation model.

In particular, the sequential auto encoder 222b feeds with an input time length sequence of multi-dimensional vectors representing normal server logs which appear at different time stamps within a particular time interval. The sequential auto encoder 222b learns latent features of the sequence of the normal server logs (i.e., server fault codes) using Long Short-Term Memory (LSTM) encoder-decoder structure. In a more illustrative manner, the sequential auto encoder 222b facilitates automatic learning on different log patterns from normal execution. Additionally, this modeling ability allows the system to flag deviations from normal system execution as anomalies. The sequential auto encoder 222b as the LSTM based sequential auto encoder is explained with reference to FIGS. 5A and 5B.

During the execution phase, the sequential auto encoder 222b, after being trained on the normal server log sequences, determines whether sequences of newly arrived server logs have anomalous behavior or not.

The stochastic recurrent neural network (SRNN) engine 224 includes suitable logic and/or interfaces for training a stochastic recurrent neural network model based at least on normal time-series data associated with the server 104. In other words, the SRNN engine 224 is trained based on the normal stream of time-series data (i.e., the healthy stream of time-series data). In one embodiment, the normal stream of time-series data is determined based at least on minimum, maximum, average and standard deviation values of the dynamic numerical features such as temperature, voltage, disk space, etc. In one example, the stochastic recurrent neural network model is called as Omni-anomaly multivariate time-series model. The SRMM model is trained to capture the patterns of the stream of time-series data by learning their robust representations. The SRNN model is explained with reference to FIGS. 6A and 6B, in detail.

The SRNN model includes an inference network (i.e., "qnet") and a generative network (i.e., "pnet"). Both inference network and the generative network are configured to utilize gated recurrent units (GRUs), variational auto encoder (VAE) and planar normalizing flows (NF) architecture to detect anomalies in the stream of time-series data. The gated recurrent units (GRUs) represent a recurrent neural network including a gating mechanism. In one alternate embodiment, the SRNN engine 224 is configured to use LSTM based model in place of the GRUs.

In the inference network (i.e., "qnet"), the gated recurrent units (GRUs) are configured to take the stream of numeric time-series (in vector form) data as inputs and determine temporal dependency between the stream of numeric time-series data. In particular, the inference network feeds with an input time-length sequence of multi-dimensional vectors representing the stream of the time-series data which appear at different time stamps within the particular time window.

The gated recurrent units (GRUs) are configured to generate a hidden variable corresponding to the time-series data at each time step using the time-series data at current time step and a hidden variable generated at the previous time step. Thereafter, hidden variables of the gated recurrent units (GRUs) determined at various time steps are provided to the variational auto encoder (VAE). The variational auto encoder is configured to learn representation of the numeric time-series data in such a way so that the variational auto encoder can map the stream of numeric time-series data to stochastic variables in a latent space. In one embodiment, to explicitly determine temporal dependence among the stochastic variables in the latent space, the SRNN model utilizes stochastic variable connection technique (e.g., Linear Gaussian State Space Model (SMM)) and a concatenation value of the respective stochastic variable at time step t−1 and hidden variable at time step t. Thereafter, the SRNN model adopts planar normalizing flows (NF) techniques for generating a probability distribution (e.g., non-Gaussian posterior distribution) in the latent space based on mean and variance (deterministically) associated with the stochastic variables.

The generative network (i.e., "pnet") is configured to take the probability distribution of the stochastic variables in the latent space as an input and tries to reconstruct the stream of time-series data. During training, the inference network and the generative network are trained using normal time-series data. To the extent the reconstructed output from the generative network differs from the original time-series data, various training techniques may be employed to adjust various weights associated with the SRNN model to reduce the reconstruction error.

During the execution phase, the SRNN engine 224, after being trained on the normal time-series data associated with the server 104, is configured to determine whether the stream of time-series data occurred within the particular time window has anomalous behavior or not.

The ensemble manager 226 includes suitable logic and/or interfaces for aggregating outputs of the auto encoder 222 and the SRNN engine 224 using an ensemble model. In one example, the ensemble model facilitates ensembling of the outputs (i.e., "reconstruction error") of the density auto encoder 222*a* and the sequential auto encoder 222*b* using a weighted average ensemble approach. In general, the weighted average ensemble approach allows multiple machine learning models to contribute to a prediction in proportion to their trust or estimated performance.

In one embodiment, during validation, the ensemble manager 226 is configured to adjust weighting factors associated with the prediction outputs of the density auto encoder 222*a*, the sequential auto encoder 222*b*, and the SRNN engine 224 according to test dataset. In one embodiment, the ensemble manager 226 is configured to determine or select threshold parameters for each prediction output of the density auto encoder 222*a*, the sequential auto encoder 222*b*, and the SRNN engine 224 by using some optimization techniques. These threshold parameters are utilized for predicting failure conditions of the server 104.

The anomaly prediction engine 228 includes suitable logic and/or interfaces for a likelihood of at least one future server anomaly based, at least in part, on the ensemble output. In other words, the anomaly prediction engine 228 is configured to predict next server logs having anomalous behavior by comparing the first, second, and third outputs from the density auto encoder 222*a*, sequential auto encoder 222*b*, and the SRNN engine 224, respectively and the threshold parameters. If the prediction outputs (i.e., "reconstruction error") are beyond the associated threshold parameters, the anomaly prediction engine 228 provides an anomaly score associated with the server logs and the numeric time-series data. Based on the anomaly score corresponding to the particular time window, the anomaly prediction engine 228 provides the numeric time-series data to the time-series network engine.

The time-series network engine 230 includes suitable logic and/or interfaces for determining a time of occurrence of at least one future server anomaly by capturing server behavior characteristics using a time-series network model. The server behavior characteristics include sequential and density patterns of the server fault codes and time-series patterns of the stream of the numeric time-series data associated with the server 104. In one example, the time-series network model is Long and Short-term Time-series network (LSTNet) model. The time-series network engine 230 may utilize multivariate time-series forecasting model to predict the time of occurrence of the future server anomaly/failure. The time-series network model is configured to capture local and long term dependencies among the stream of time-series data. A linear component may also be included in the time-series network model to make the model more robust for the stream of time-series data.

In one embodiment, the time-series network model is trained based at least on abnormal server data.

In one embodiment, the time-series network model utilizes multiple neural network layers (such as, convolutional neural network (CNN) layer, recurrent neural network layer, etc.). The convolutional neural network (CNN) layer is used simultaneously to capture short-term local dependency among the server behavior characteristics and local dependencies between variables present in the server logs and the stream of the numeric time-series data. The output of the CNN layer is simultaneously fed into the RNN layer for capturing relatively long-term dependencies between the variables.

In one embodiment, the time-series network model may also include an autoregressive layer for stabilizing predictions by combining a linear sequence to outputs of the CNN and RNN layers. The aim of the autoregressive layer is to decompose the prediction output of time-series network engine 230 into a linear part. The output of the non-linear layers is mainly focused on local dependencies and hidden states of the layers and non-linear parts containing recurring patterns. The output of the autoregressive layer includes all dimensions having a same set of linear parameters. Further, the outputs of the CNN, RNN layers and the autoregressive layer are integrated to obtain a prediction output that provides the time of occurrence of future server anomaly. In one example, the time of occurrence denotes time difference between the next server failure and end time of the particular time window.

Figure 3A:
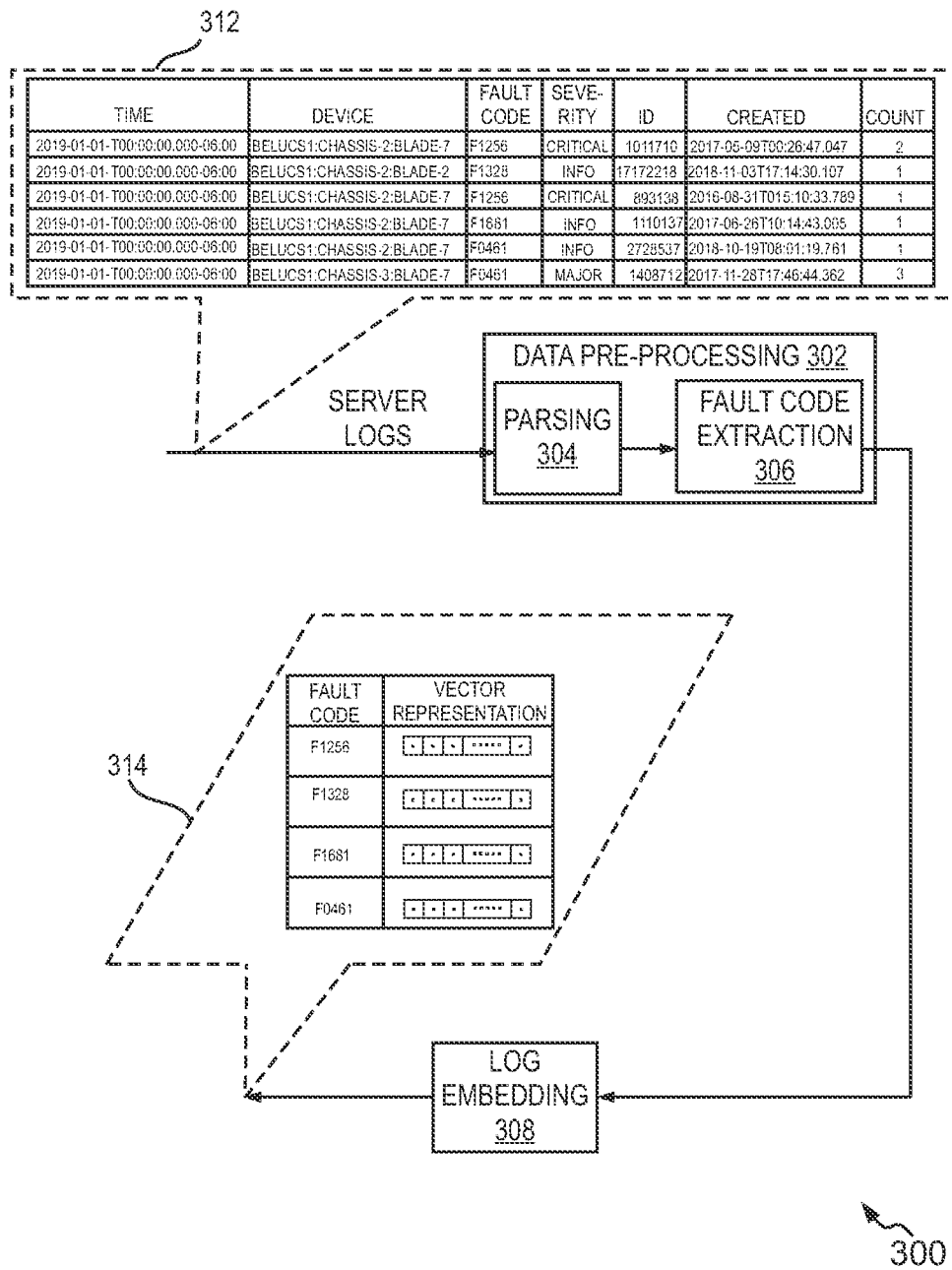
FIG. 3A is a schematic block diagram representation of a process flow for data pre-processing of server logs, in accordance with an example embodiment.

Referring now to FIG. 3A, a schematic block diagram representation 300 of a process flow for data pre-processing methods of the server logs, is shown, in accordance with an embodiment of the present disclosure.

The processor 206 is configured to receive a plurality of server logs (see, table 312) from the server 104 within a particular time window (e.g., 3 hours). Each server log includes a plurality of data fields such as, time of occurrence, device details, a server fault code, a server severity rating, frequency of occurrences etc. The processor 206 is configured to perform data pre-processing (see 302) over the received server logs and extract server fault codes and associated frequency of occurrences of the server fault codes. The server fault code may be of multiple types such as, physical device faults, server task-level faults, operational faults, and network issues, etc. In one example, the server severity rating may be 'cleared', 'condition', 'critical', 'info', 'major', 'minor', 'warning'. The server fault code represents a failure in the server 104 for which an alarm may be raised when the server severity rating goes to a critical level. During a lifecycle of the server fault, it can change from one server severity rating to another. Each server fault code includes information about the operational state of computing components of the server 104 at the time when the server fault was raised.

The processor 206 is configured to parse the server logs into a corresponding structured data sequence (see, 304). Each structured data sequence is configured to include a server fault code (e.g., "F1256") extracted from its corresponding log (see, 306). Then, the processor 206 is configured to apply an embedding algorithm to generate a vector representation associated with each server fault code. More specifically, the processor 206 is configured to apply word2vec model (see, 308, i.e., "log embedding") which was trained to generate vector representation (see, table 314) associated with each server fault code.

Figure 3B:
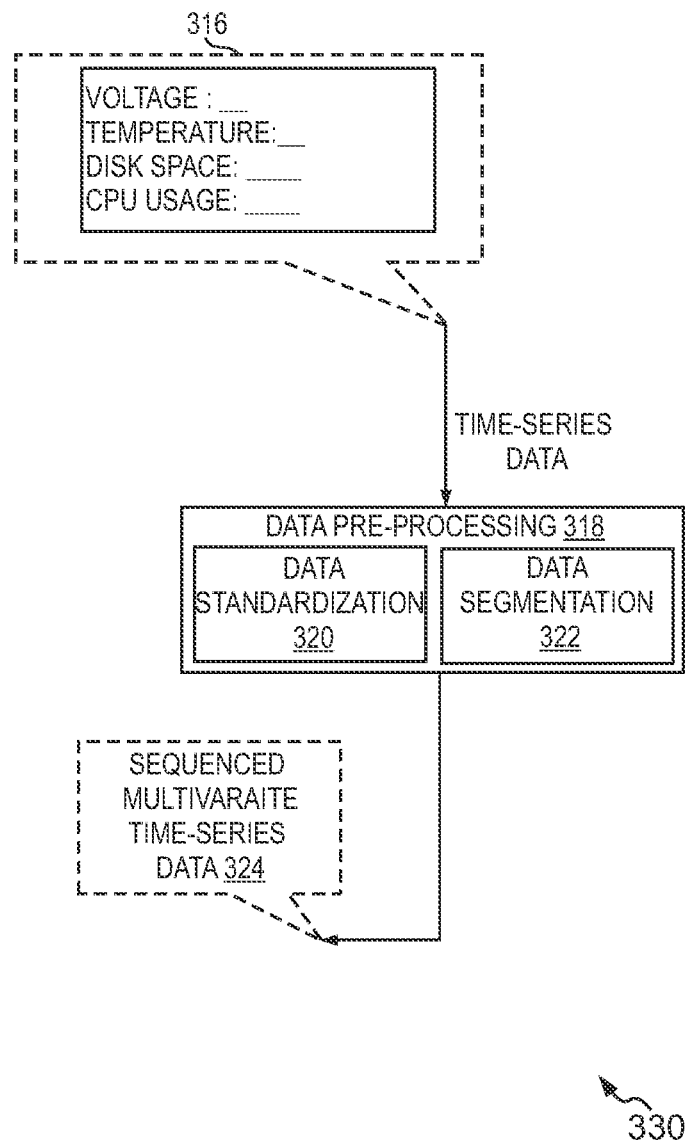
FIG. 3B is a schematic block diagram representation of a process flow for data pre-processing of a stream of numeric time-series data, in accordance with an example embodiment.

Referring now to FIG. 3B, a schematic block diagram representation 330 of a process flow for data pre-processing of the numeric time-series data is shown, in accordance with an embodiment of the present disclosure.

The processor 206 is configured to receive a stream of numeric time-series data (see, table 316) from the server 104 periodically. The stream of numeric time-series data includes numeric time-series features associated with the server 104 or for a particular device of the server 104. The time-series data may include values of voltage, temperature, disk space, CPU usage, etc. The processor 206 is configured to perform data pre-processing over the numeric time-series data (see, 318). The processor 206 is configured to perform standardization over the time-series data (see, 320). The standardization of the time-series data involves rescaling the distribution of the values of the stream if numeric time-series data so that the mean of the values of the numeric time-series data is 0 and the standard deviation is 1. Further, after standardization, the standardized time-series data is segmented into sequences using data segmentation (see, 322). An approach called sliding window method is used to facilitate the segmentation of the time-series data. The segmentation involves extracting significant patterns in the time-series data. The sliding window method is a temporal approximation of the actual time-series data. Also, the sliding window method aims to reduce the overall approximation error given a specific amount of information.

More specifically, the sliding window approach generates a sequence of multivariate time-series data (see, 324). Since the numerical time-series data is of multi-dimension, a multivariate time-series data is generated after data pre-processing.

Figure 4:
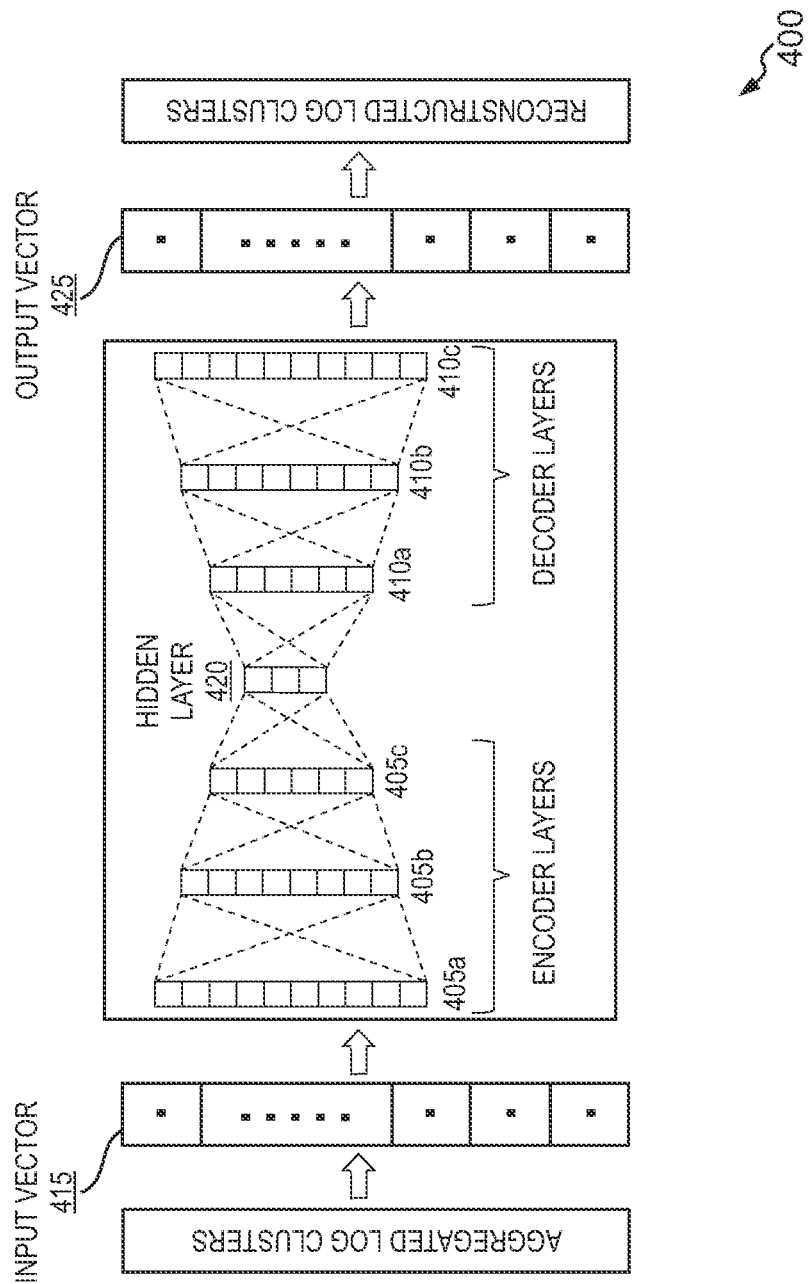
FIG. 4 represents a simplified block diagram of a stacked auto encoder, in accordance with an example embodiment.

Referring now to FIG. 4, a simplified block diagram of a stacked auto encoder 400, is shown, in accordance with an embodiment of the present disclosure. The density auto encoder 222a is a type of the stacked auto encoder that may include one or more encoder layers 405a, 405b, 405c, one or more decoder layers 410a, 410b, 410c. In general, the stacked auto encoder is a feed-forward neural network in which neural networks, referred to as auto encoders, are stacked into layers. The auto encoder is a neural network in which the encoder layer and the decoder layer have the same number of neurons (the same number of units) and the middle layers (hidden layers) have fewer neurons (units) than the input layer (output layer). While three encoder layers and three decoder layers are depicted in figures, this is not meant to be limiting; in various embodiments, more or less encoder and/or decoder layers may be employed.

An input vector 415 for the stacked auto encoder 400 is a time invariant one-dimensional vector, where a value at each index value of the input vector represents a normalized value of the frequency of occurrences of the associated server fault code within a particular time interval. For example, suppose, number of total server fault codes associated with the server logs appeared within 3 hours window are 1000 and a particular server fault code occurs 100 times within the 3 hours window, then, an input value (i.e., "normalized value") associated with the particular server log in the input vector will be 0.1 (i.e., number of the appearance of the particular server fault code/total server fault codes appeared within 3 hours window). The length of the input vector is equal to the number of server fault codes.

The input vector is fed into a first encoder layer 405a. Each encoder layer reduces the dimensions of the input vector by transforming the input into a new input vector of fewer dimensions. The dimensions of each encoder layer are different from the previous encoder layer (e.g., are not a subset of the dimensions from the previous encoder layer). The last encoder layer 405c feeds an output into a hidden layer 420.

The one or more decoder layers 410a, 410b, and 410c take an output of the hidden layer 420 as an input and try to reconstruct the same input vector at the last decoder layer 410c. A reconstructed vector (i.e., "output vector 425") may then be compared with the original input vector by calculating a reconstruction error (i.e., mean squared error $\|x-x'\|^2$). During the training process, the goal is to ensure that the reconstructed vector (i.e., "output vector 425") is the same as the original input vector. If the original input vector 415 and the reconstructed vector (i.e., "output vector 425") are different, various optimization techniques such as back propagation, stochastic gradient descent, etc., may be employed to adjust weights associated with the various encoder and decoder layers.

In one embodiment, the stacked auto encoder 400 is trained/fine-tuned based on a loss function which is utilized for updating weight parameters of connections among one or more encoder and decoder layers. The loss function is a function of a mean squared error (i.e., reconstruction error). More illustratively, the stacked auto encoder 400 evaluates the loss function that compares the output vector generated by the last decoder layer 410c with the input vector. Further, the stacked auto encoder 400 also evaluates a condition whether the sum of all values present in the reconstructed vector is equal to '1' or not. Based on the evaluation, the stacked auto encoder 400 adjusts one or more parameters of one or both of the encoder layers and the decoder layers to improve (e.g., reduce or otherwise optimize) the loss function.

Once, after being trained or fine-tuned, when the stacked auto encoder 400 encounters a plurality of server logs with an aggregated reconstruction error greater than a predetermined threshold value, then it indicates the deviation of occurrences of the plurality of server logs from expected log occurrences.

The density auto encoder 222a (as shown in FIG. 2) is trained using normal server log data (when the server 104 is working normally). During the execution process, when the density auto encoder 222a determines a reconstruction error (i.e., mean squared error) for server logs being higher than a threshold value, it means that frequency pattern of the server logs has an anomalous behavior.

Figure 5A:
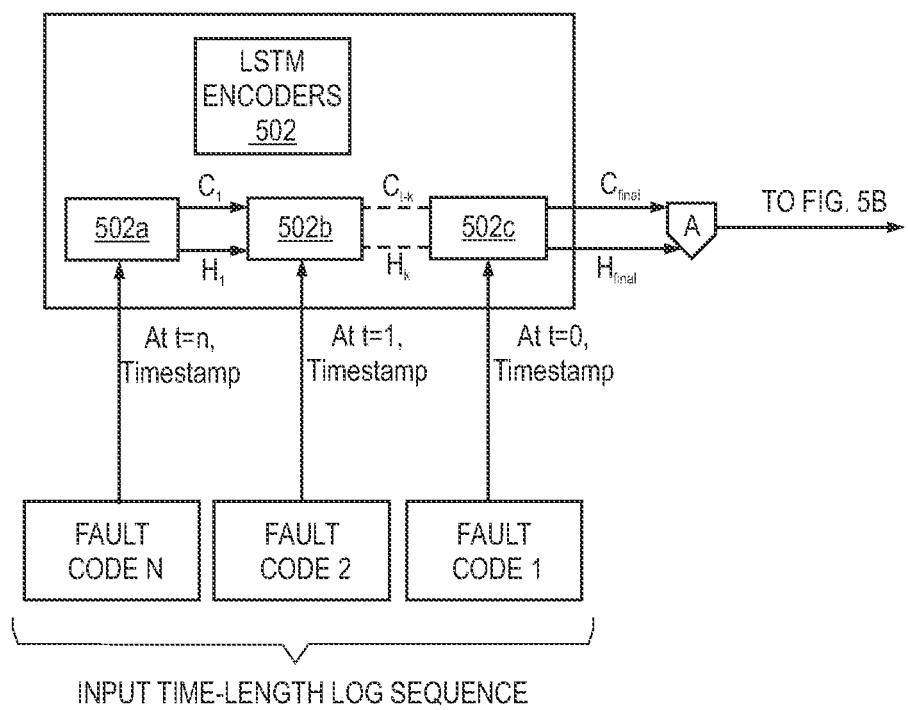
FIGS. 5A and 5B, collectively, represent a simplified block diagram of a LSTM based sequential auto encoder, in accordance with an embodiment of the present disclosure.
Figure 5B:
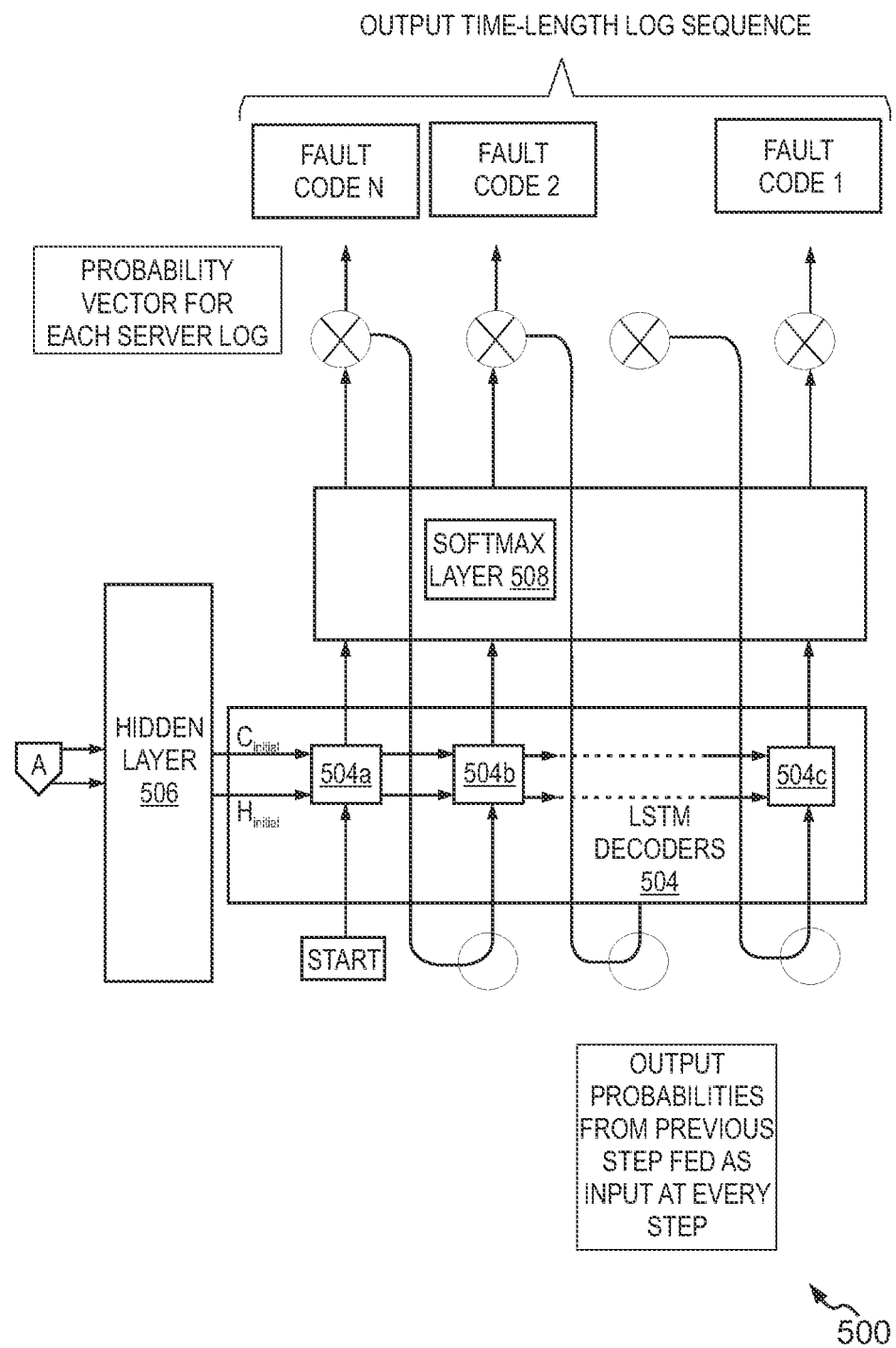

FIGS. 5A and 5B, collectively, represent a simplified block diagram of a Long Short Term Memory (LSTM) based sequential auto encoder 500, in accordance with an embodiment of the present disclosure. The sequential auto encoder 222b (as show in FIG. 2) is a type of the LSTM based sequential auto encoder 500. The LSTM based sequential auto encoder 500 is a type of a deep neural network that models the sequence of server fault codes using a Long Short-Term Memory (LSTM). This modeling ability allows for automatic learning on different fault code occurrence pattern sequences from normal execution. Additionally, this modeling ability allows the system to flag deviations from normal system execution as anomalies.

As shown in the FIGS. 5A and 5B, a pair of LSTM encoder-decoder structure facilitates end-to-end mapping between an ordered multidimensional input sequence of server logs (i.e., "server fault codes") and its matching output sequence. The LSTM based sequential auto encoder 500 includes LSTM encoders 502 and LSTM decoders 504. Although only three unrolled LSTM encoders are shown in FIGS. 5A and 5B, it will be appreciated that any number of LSTM blocks may be used (e.g., corresponding to the number of server logs that are selected for use).

More particularly, a series of the LSTM encoders 502 is fed with multi-dimensional vectors representing server logs which appear at different time stamps, wherein the server logs include server fault codes. The input to the LSTM encoders at each time stamp is simply a vector associated with a server log appeared at that timestamp. More specifically, a time length sequence of occurrence of server fault codes is captured by the LSTM encoders 502 at the different timestamps. Further, a dummy server fault code is also provided to the LSTM encoders 502 after each time length sequence of server fault codes.

Each LSTM encoder (e.g., 502a, 502b, 502c) learns a representation of a sequence of server logs during a particular time interval and maintains a hidden vector "Hk," and a cell state vector "Ct-k". Both the hidden vector and the cell state vector are passed to a next LSTM encoder (e.g., from LSTM encoder 502a to LSTM encoder 502b) to initialize the next/subsequent LSTM encoder's state. At the end, hidden and cell state vectors of last LSTM encoder 502c are passed to a hidden layer 506.

As shown in the FIG. 5B, encoded hidden and cell state vectors are transferred to the LSTM decoders 504. The LSTM decoders 504a, 504b, and 504c try to reconstruct the same input time-length log sequence at the output. A reconstructed time-length log sequence may then be compared with the original input time-length sequence by calculating a reconstruction error. The LSTM decoders 504 try to reconstruct the same input vector and generate a context decoder output and a current decoder hidden state at each decoder time step. Further, the introduced dummy log after each time length log sequence is utilized for stopping the decoding process. The context decoder output of each LSTM decoder passes to a softmax layer 508 which generates a probability vector representing an occurrence of all the server fault codes. The sum of all probability vector values is '1' which acts as one of the constraints for reconstruction. In one example, if the LSTM decoders 504 could not be able to reconstruct more than a predetermined number of server logs, the LSTM based sequential auto encoder 500 adjusts various factors of LSTM encoders and decoders.

In one non-limiting example, in order to configure the LSTM encoders 502 and the LSTM decoders 504, machine learning training techniques (e.g., using Stochastic Gradient Descent, back propagation, etc.) can also be used. Thus, the LSTM based sequential auto encoder 500 provides a prediction accuracy as an output which represents a reconstruction probability of a time-length log sequence of server logs at decoder side.

In one embodiment, an LSTM based sequential auto encoder (i.e., "the sequential auto encoder 222b") is trained using normal server logs (when the server 104 is working normally). Further, during the execution process, when the sequential auto encoder 222b detects a reconstruction probability for a sequence of server logs being higher than a threshold value, it means that the sequence of the server logs has an anomalous behavior.

Figure 6A:
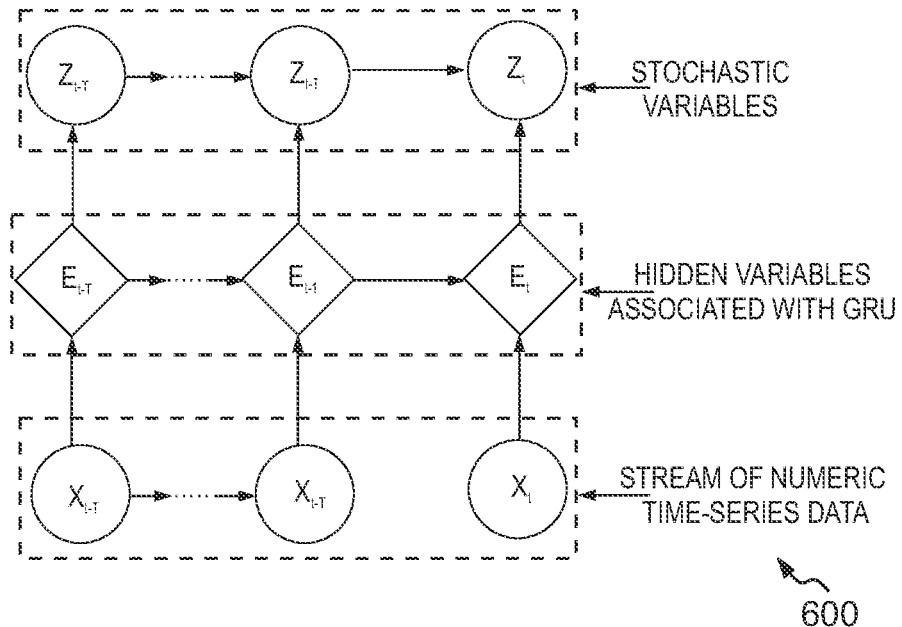
FIGS. 6A and 6B, collectively, represent graphical models corresponding to the stochastic recurrent neural network (SRNN) model, in accordance with one embodiment of the present disclosure.
Figure 6B:
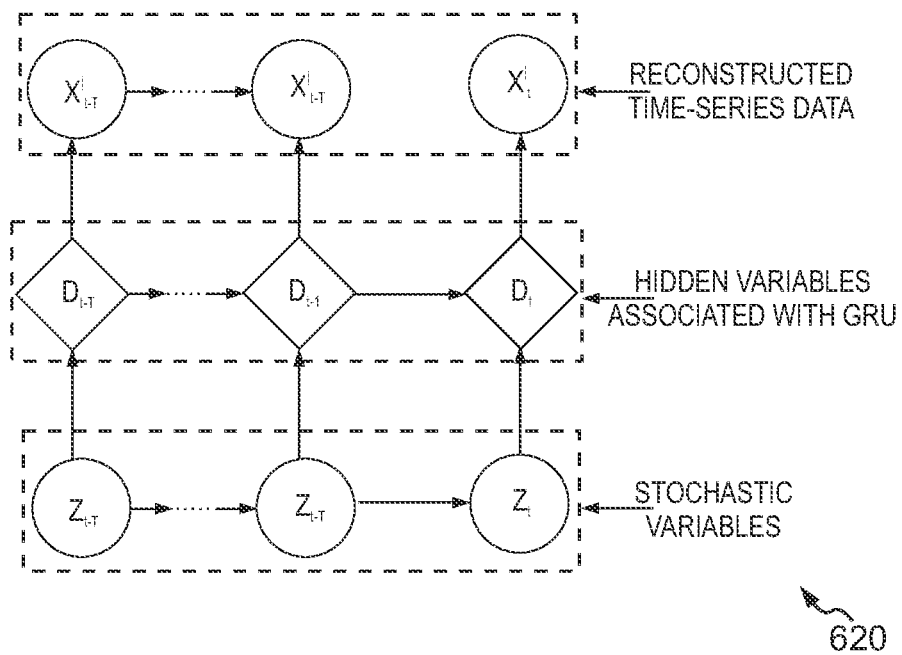

FIGS. 6A and 6B, collectively, represent graphical models corresponding to the stochastic recurrent neural network (SRNN) model, in accordance with one embodiment of the present disclosure. In one embodiment, the SRNN model is utilized for determining an anomaly in a stream of time-series numerical features associated with the server 104. The SRNN model is configured to learn robust latent representations of the stream of time-series numerical features associated with the server 104 taking into consideration of both temporal dependence and stochasticity of the stream of numeric time-series data. During the training phase, the SRNN model is trained based on normal time-series data (i.e., healthy data) associated with the server 104.

The SRNN model includes an inference network 600 (i.e., "qnet") and a generative network 620 (i.e., "pnet"). Both the inference network 600 and the generative network 620 include gated recurrent units (GRUs), variational auto encoders (VAE), and planar normalizing flows (NF) to detect anomalies in the numeric time-series data of the server 104.

For generating the inference network 600, the gated recurrent units (GRUs) are configured to take the stream of numeric time-series data as inputs and determine temporal dependency for each numeric time-series data which are denoted in x-domain. For example, at time step t, input node ($x_t$) is a vector representation of a particular time-series data. In more illustrative manner, the input node ($x_t$) represents the value of the particular time-series data captured at the server 104 at the time step t. The gated recurrent units (GRUs) generate a hidden variable ($e_t$) using the input node ($x_t$) and previous GRU hidden variable ($e_{t-1}$), where the hidden variable is deterministic in nature. Thereafter, hidden variables of the gated recurrent units (GRUs) determined at various time steps are provided to the variational auto encoder (VAE). The variational auto encoder is configured to learn representation of the numeric time-series data in such a way so that the variational auto encoder can map the numeric time-series data in x-domain to stochastic variables in z-space using the hidden variables ($\{e_1, e_2, \ldots e_t\}$).

In one embodiment, to explicitly determine temporal dependence among the stochastic variables in the latent space, the SRNN model utilizes stochastic variable connection technique (e.g., Linear Gaussian State Space Model (SMM)) and a concatenation value of the respective stochastic variable $z_{t-1}$ at time step t−1 and the hidden variable at time step t. Thereafter, the SRNN model adopts planar normalizing flows (NF) techniques for generating a probability distribution (e.g., non-Gaussian posterior distribution) in the latent space based on mean and variance (deterministically) associated with the stochastic variables.

In one embodiment, the generative network 620 follows similar operations for reconstructing the stream of time-series data. The generative network 620 depicts the reconstruction of the numeric time-series data based on the probability distribution associated with the stochastic variables. In the generative network 620, variable $x_t'$ represents reconstructed output and '$d_t$' represents hidden variables associated with GRUs.

A reconstruction loss or reconstruction probability may be determined based on the reconstructed output. In the embodiment, the processor 206 is configured to compare the reconstruction loss with a threshold value. When the reconstruction loss is greater than the threshold value, the processor is configured to mark those time-series data as anomalous.

Figure 6C:
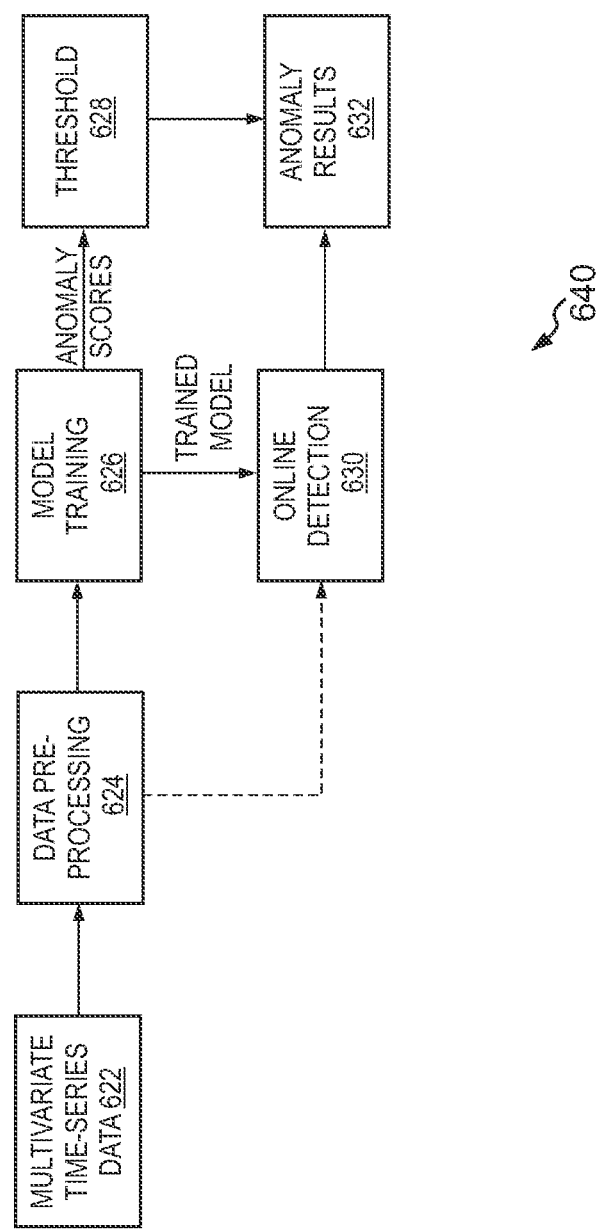
FIG. 6C represents a schematic block diagram of training and execution processes of the stochastic recurrent neural network (SRNN) model, in accordance with an embodiment of the present disclosure.

FIG. 6C represents a schematic block diagram 640 of the training and execution processes of the stochastic recurrent neural network (SRNN) model, in accordance with an embodiment of the present disclosure. The processor 206 is configured to determine whether a stream of numeric time-series data is anomalous or not, based on temporal dependencies and stochasticity of the stream of the numeric time-series data that are determined using the SRNN model.

At first, the stream of time-series data for a particular time window is fed to the processor 206 (see, 622). The stream of time-series data may include a plurality of performance metrics such as voltage temperature, disk space, CPU storage, etc., associated with the server 104. The processor 206 is configured to perform data pre-processing over the stream of time-series data using standardization and segmentation techniques (see, 624).

After data pre-processing, a training time-series data associated with the server 104, usually spanning a period of time (e.g., a couple of weeks), is used to learn the SRNN model that captures the normal patterns of multivariate time-series and outputs an anomaly score for each observation.

The training is carried out based on the normal time-series data (i.e., when the server is working normally). Using previous normal time-series data, the SRNN model may be trained to predict any deviation in the time-series data to detect anomaly (see 626). The processor 206 is also configured to output an anomaly score for each time-series data in training time.

In an embodiment, the processor 206 is configured to choose an anomaly threshold automatically based on anomaly scores for all the observations selected during the training process (see, 628). This facilitates the automatic selection of the threshold score based on the anomaly scores. In one embodiment, a threshold value may be generated using Extreme Value Theory (EVT) algorithm. In general, EVT is a statistical theory that is used to find the law of values at extremes, and the values at extremes are usually placed at the ends of a probability distribution. EVT is advantageous as it makes no assumption on the distribution of data when finding the values at extremes.

During the detection process (see, online detection 630), the processor 206 is configured to determine an anomaly score for numeric time-series data received in a specific time period using the trained SRNN model. During reconstruction, a reconstruction loss is determined and is used as the anomaly score for the numeric time-series data associated with the specific time period (see 632). In one example, if the anomaly score of the numeric time-series data $x_t$ is below a threshold value, $x_t$ will be declared as anomalous, otherwise, it is normal. If $x_t$ is detected as an anomaly, the processor 206 is configured to estimate and rank the contribution (i.e., reconstruction probability) of each dimension in $x_t$. In other words, based on the anomaly score, the processor 206 is configured to determine anomalous behavior of the numeric time-series data.

Figure 7:
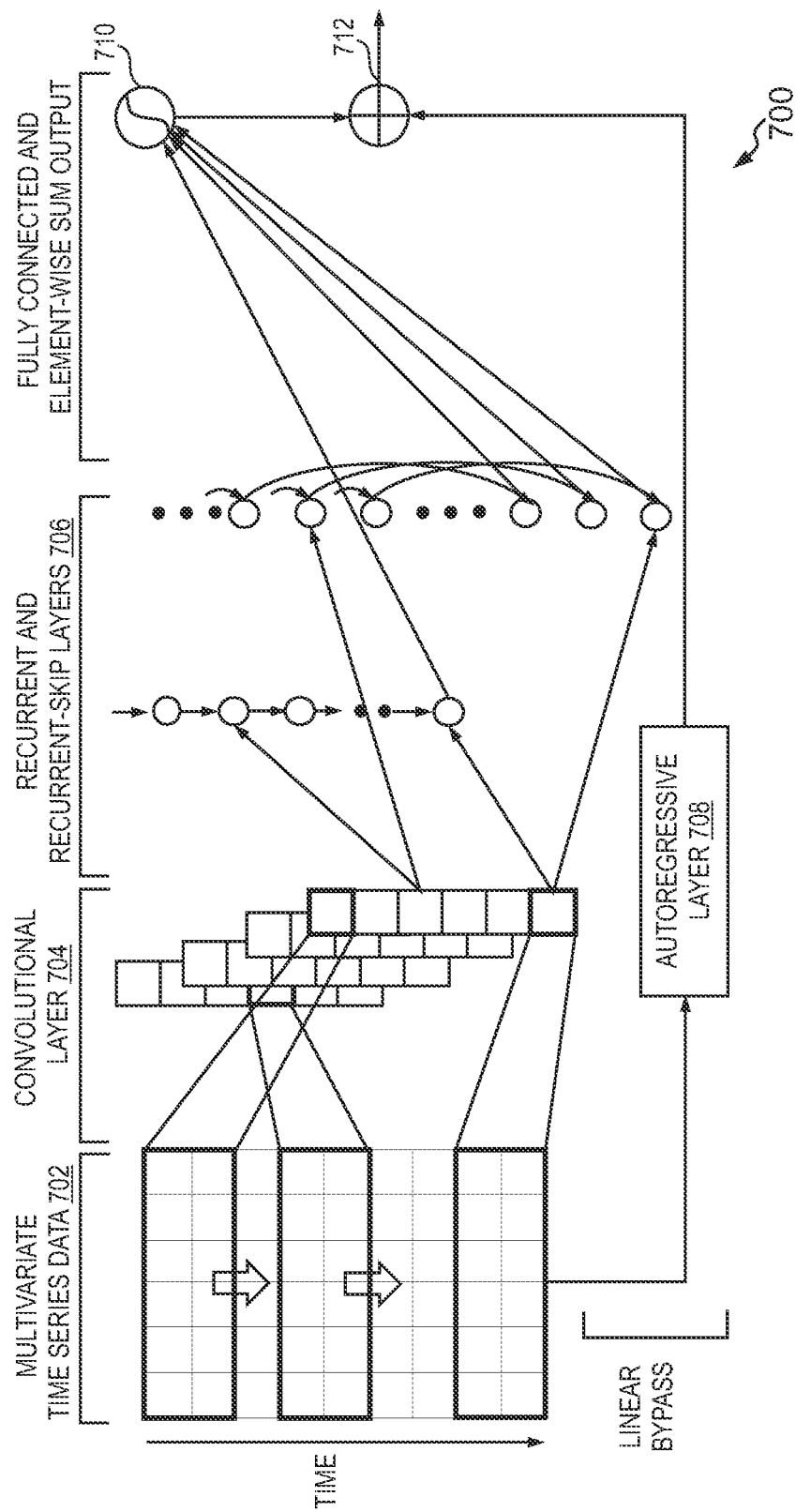
FIG. 7 illustrates a schematic representation of a time-series network model, in accordance with one embodiment of the present disclosure.

FIG. 7 illustrates a schematic representation of a time-series network model 700, in accordance with one embodiment of the present disclosure. The time-series network model 700 is utilized for determining the time of occurrence of at least one future server anomaly by capturing time-series patterns of the stream of numeric time-series data. In one example, the time-series network model implements a deep learning framework, which is specially designed for a multivariate time series prediction task, and mixes long-term and short-term modes. In one example, the time-series network model is Long and Short-term Time-series network (LSTNet) model.

The time-series network model 700 includes non-linear layers (including a convolutional layer 704, and recurrent and recurrent-skip layers 706) and a linear layer (an autoregressive layer 708). The time-series network model 700 is used for time-series forecasting to predict the time of occurrence of the next server failure.

In one embodiment, after predicting at least one future server anomaly based on the server logs and the stream of numeric time-series data occurred within a particular time window, the processor 206 is configured to provide the stream of numeric time-series data along with time-series patterns of server logs which have anomalous behavior, to the time-series network model 700.

In an embodiment, the processor 206 is configured to formulate multivariate time-series data 702. In one example, the multivariate time-series data 702 is denoted as $x=\{x_1, x_2, x_3, \ldots, x_T\}$. The task of the time-series network model 700 is to predict the time of occurrence of the future server anomaly after end time T of the particular time window.

At first, the multivariate time-series data 702 is provided to the convolutional layer 704 which is a convolutional neural network (CNN) without pooling of data. The convolutional layer 704 is configured to extract short-term patterns in time dimension from the multivariate time-series data 702 (i.e., local temporal dependencies between the time series data).

Further, output of the convolutional layer 704 is fed to the recurrent and recurrent-skip layers 706. In an embodiment, the recurrent layer includes, but is not limited to, gated recurrent units (GRUs). The gated recurrent unit is utilized for capturing long-term dependencies between the multivariate time-series data 702. In one embodiment, the recurrent layer uses RELU (Rectified Linear Unit) function as hidden update activation function.

In an embodiment, the recurrent-skip layer includes gated recurrent unit (GRU) along with LSTM structure and utilized for memorizing historical time-series data and keeping a track on long-term dependencies of the multivariate time-series data 702. Since it is hard to capture dependencies of longer times (such as more than 24 hours window), the recurrent-skip layer is formed based on recurrent structure with temporal skip connections to extend the temporal span and the data flow. Further, in an embodiment, outputs from the recurrent layer and the recurrent-skip layer are combined using a dense layer.

In one embodiment, the time-series network model 700 utilizes attention mechanism (not shown in figure) to learn weighted combination of hidden representation at each time window position of input matrix (representing time-series data at each time window).

In one embodiment, the autoregressive layer 708 is used to stabilize a prediction output by combining a linear univariate sequence to the non-linear layers' output 710 to obtain a prediction output 712. The purpose of the autoregressive layer 708 is to decompose the prediction output of time-series network model 700 into a linear part. The non-linear layers output 710 are mainly focused on local dependencies and hidden states of the non-linear layers and a non-linear part containing recurring patterns. The output of the autoregressive layer 708 includes all dimensions having the same set of linear parameters. Further, outputs of the non-linear layers and output of the autoregressive layer 708 are integrated to obtain a final prediction output 712 at time stamp t. The final prediction output denotes the time of occurrence associated with future server failure occurrence.

During training, the time-series network model is trained using abnormal time-series data. To the extent the reconstructed output differs from the original time-series data, various training techniques may be employed to adjust various weights associated with the time-series network model 700 to reduce the reconstruction error. In one embodiment, the time-series network model 700 uses a loss function for reducing the reconstruction error by adjusting various weights associated with the time-series network model 700.

Figure 8:
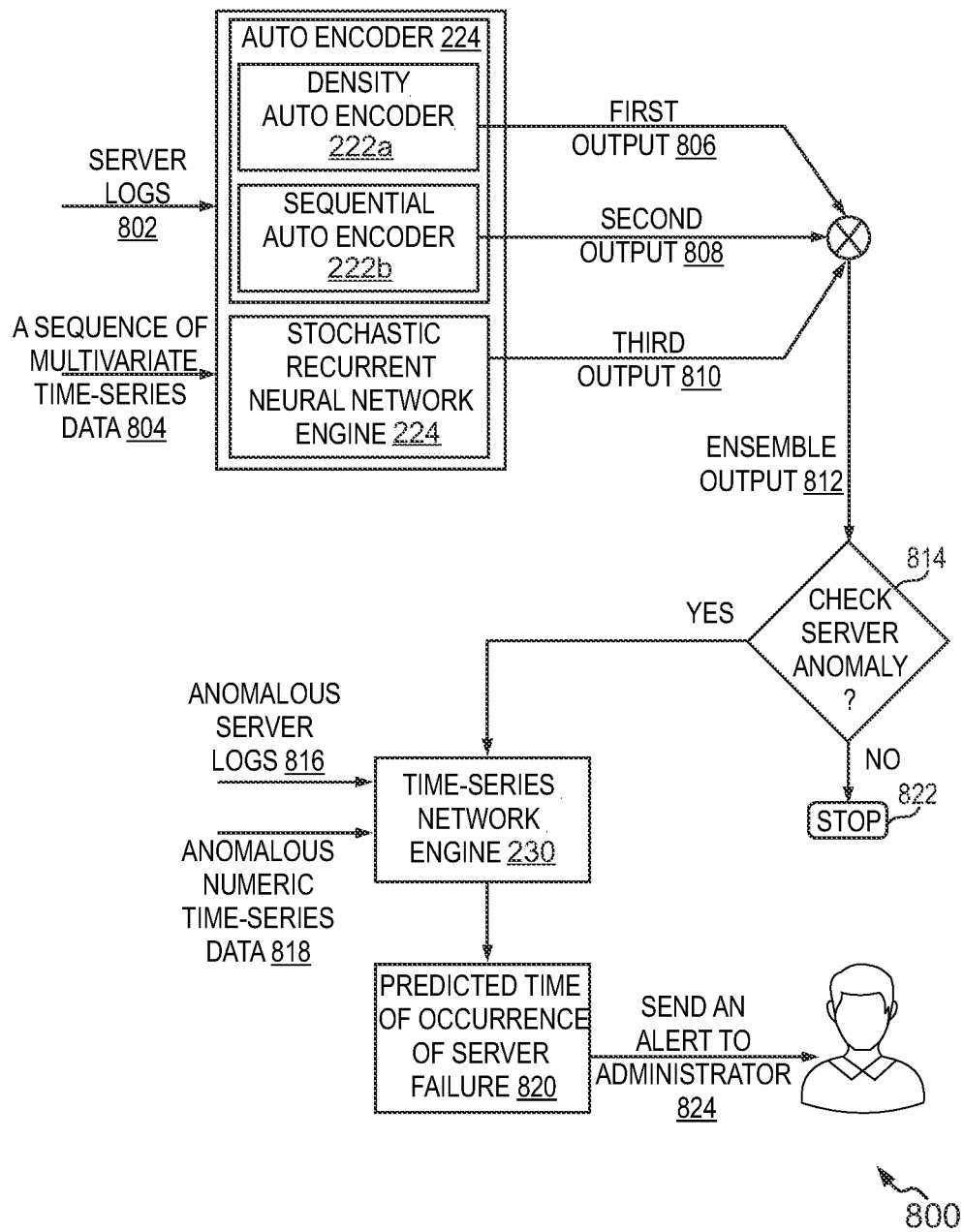
FIG. 8 is a schematic block diagram representation of an execution process (i.e., real-time implementation process) associated with the anomaly time prediction system, in accordance with one embodiment of the present disclosure.

Referring now to FIG. 8, a schematic block diagram representation 800 of an execution process (i.e., real-time implementation process) associated with the anomaly time prediction system 200, is shown, in accordance with an embodiment of the present disclosure.

As mentioned previously, the density auto encoder 222a and the sequential auto encoder 222b are trained based on healthy server logs. The SRNN engine 224 is trained based on health time-series data. The time-series network engine 230 is trained based on unhealthy server fault codes and time-series data.

During the execution phase, the auto encoder 222 takes server logs 802 (i.e., server fault codes) occurred within a particular time window as an input. The density auto encoder 222a generates a first output 806 (i.e., "reconstruction error") associated with each server log. The sequential auto encoder 222b generates a second output (i.e., probabilities of temporal occurrence of each server log) associated with time length sequence of the server logs. The SRNN engine 224 is fed with a sequence of multivariate time-series data 804 and generates a third output (i.e., "reconstruction error associated with each time-series data metric") using the trained SRNN model.

In one non-limiting example, if a particular server fault code "F1256" is occurred four times in the particular time window that is more than usual occurrence (i.e., "two times") of the particular server fault code "F1256" during the particular time window, the density auto encoder 222a would generate a first output 806 indicating anomalous behavior.

Thereafter, the first output 806, the second output 808, and the third output 810 are ensembled using a weighted average ensemble approach for obtaining an ensemble output 812. Further, at 814, the processor 206 is configured to check the ensemble output 812 for at least one future server anomaly by determining whether the ensemble output 812 is beyond a predetermined threshold value or not.

When the ensemble output 812 is more than the predetermined threshold value, the time-series network engine 230 is triggered. The processor 206 is configured to provide anomalous server logs 816 and anomalous numeric time-series data 818 to the time-series network engine 230. The time-series network engine 230 is configured to provide the time of occurrence 820 of the at least one future server anomaly. The time of occurrence 820 may be a predicted time of occurrence of the at least future server failure. In one embodiment, the time-series network engine 230 is configured to capture both sequence and density patterns of the server fault codes and the time-series patterns of the numeric time-series data (such as temperature, voltage, memory usage, etc.) using CNN and RNN models. Thereafter, the processor 206 may be configured to send alerts to administrators (see 824) about time of occurrence of the future server failure so that preventive actions can be taken proactively.

In one embodiment, the processor 206 may receive a start and end time of the aggregated server logs and numeric time-series data of the server 104. Based on the predicted time of occurrence of future server failure, the processor 206 may calculate a time difference between the time of occurrence of the server failure and the end time of the server and send an alert to the administrator regarding the time difference.

In one embodiment, when the ensemble output 812 is less than the predetermined threshold value, the execution process stops at 822.

Figure 9:
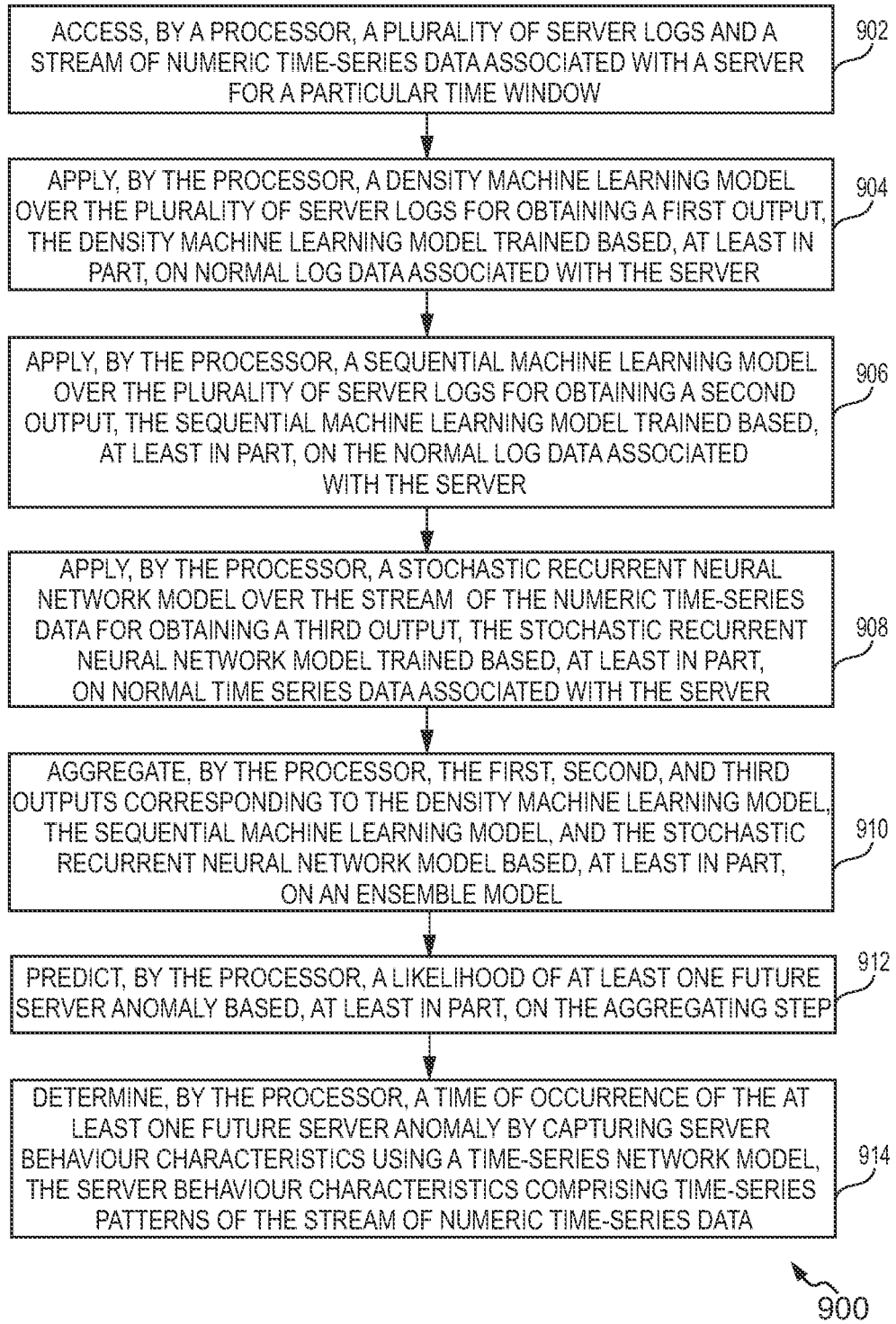
FIG. 9 represents a flow diagram of a computer-implemented method for predicting time of future server failures using server logs and a stream of time-series data occurred during a particular time window, in accordance with an example embodiment.

FIG. 9 represents a flow diagram of a computer-implemented method 900 for predicting time of future server failures using server logs and a stream of time-series data occurred during a particular time window, in accordance with an example embodiment. The method 900 depicted in the flow diagram may be executed by the anomaly time prediction system 102 or the anomaly time prediction system 200. Operations of the method 900, and combinations of operation in the method 900, may be implemented by, for example, hardware, firmware, a processor, circuitry and/or a different device associated with the execution of software that includes one or more computer program instructions. The method 900 starts at operation 902.

At operation 902, the method 900 includes accessing, by a processor 206, a plurality of server logs and a stream of numeric time-series data associated with a server 104 for a particular time window. The stream of numeric time-series data represents performance metrics associated with the server 104 recorded within the particular time window (e.g., 3 hours).

At operation 904, the method 900 includes applying, by the processor 206, a density machine learning model over the plurality of server logs for obtaining a first output. The density machine learning model is trained based, at least in part, on normal log data associated with the server 104.

At operation 906, the method 900 includes applying, by the processor 206, a sequential machine learning model over the plurality of server logs for obtaining a second output. The sequential machine learning model is trained based, at least in part, on normal log data associated with the server 104.

At operation 908, the method 900 includes applying, by the processor 206, a stochastic recurrent neural network model over the stream of the numeric time-series data for obtaining a third output. The stochastic recurrent neural network model is trained based, at least in part, on normal time-series data associated with the server 104.

At operation 910, the method 900 includes aggregating, by the processor 206, the first, second, and third outputs corresponding to the density machine learning model, the sequential machine learning model, and the stochastic recurrent neural network model based, at least in part, on an ensemble model.

At operation 912, the method 900 includes predicting, by the processor 206, a likelihood of at least one future server anomaly based, at least in part, on the aggregating.

At operation 914, the method 900 includes determining, by the processor 206, a time of occurrence of the at least one future server anomaly by capturing server behavior characteristics using a time-series network model. The server behavior characteristics includes time-series patterns of the stream of numeric time-series data.

Figure 10:
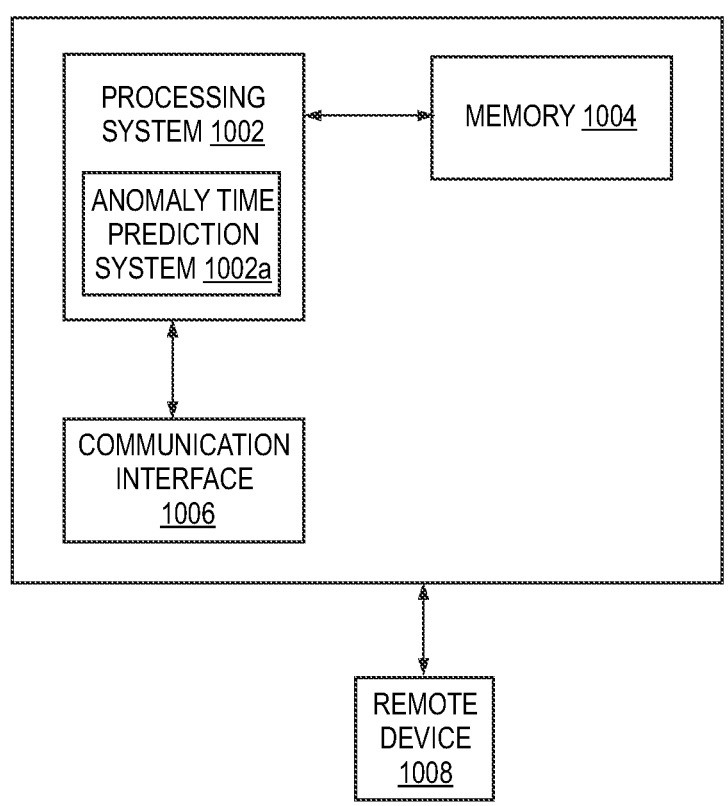
FIG. 10 is a simplified block diagram of a server system, in accordance with an example embodiment of the present disclosure.

FIG. 10 is a simplified block diagram of a server system 1000, in accordance with one embodiment of the present disclosure. In one embodiment, the server system 1000 is an example of a server system that includes the anomaly time prediction system 102 shown and explained with reference to FIG. 1. The server system 1000 includes a processing system 1002 configured to extract programming instructions from a memory 1004 to provide various features of the present disclosure. Further, two or more components may be embodied in one single component, and/or one component may be configured using multiple sub-components to achieve the desired functionalities. Some components of the server system 1000 may be configured using hardware elements, software elements, firmware elements and/or a combination thereof. In one embodiment, the server system 1000 is configured to determine time of occurrence of next server failures based on server logs and numeric time series data processed within a particular time window.

Via a communication interface 1006, the processing system 1002 receives information from a remote device 1008 such as one or more databases, or an administrator monitoring server activities. The processing system 1002 also includes an anomaly time prediction system 1002a. The server system 1000 may perform similar operations as performed by the anomaly time prediction system 200 for predicting time of server failure by accessing different anomalous behaviors of server logs and numeric time-series data from the remote device 1008 such as, the server 104, using one or more machine learning models. For the sake of brevity, the detailed explanation of the server system 1000 is omitted herein with reference to the FIG. 2.

The components of the server system 1000 provided herein may not be exhaustive, and the server system 1000 may include more or fewer components than those depicted in FIG. 10. Further, two or more components may be embodied in one single component, and/or one component may be configured using multiple sub-components to achieve the desired functionalities. Some components of the server system 1000 may be configured using hardware elements, software elements, firmware elements and/or a combination thereof.

Figure 11:
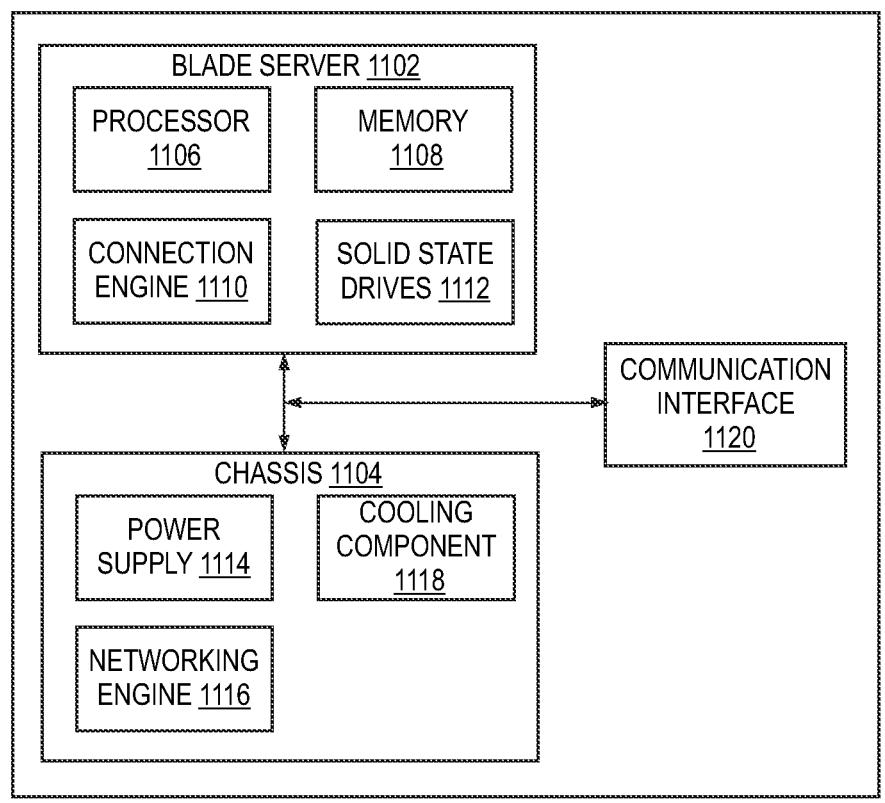
FIG. 11 is a simplified block diagram of a server (e.g., datacenter server), in accordance with an embodiment of the present disclosure.

FIG. 11 is a simplified block diagram of a server 1100, in accordance with an embodiment of the present disclosure. The server 1100 is an example of the server 104 of FIG. 1. In one example, the server 1100 is a data center server. Data center servers may be maintained by various institutions for seamlessly transmission of services to a plurality of users simultaneously. For example, web hosting, cluster computing, etc., may be performed by utilizing such data center servers. Data center servers need to be able to process high number of executions at a time and be able to hold the load. The server 1100 includes a blade server 1102, a chassis 1104, and a communication interface 1120. The blade server 1102 may further include a processor 1106, memory 1108, a connection engine 1110 and solid state drives 1112. The chassis may further include power supply 1114, networking engine 1116, and a cooling component 1118. Further, two or more components may be embodied in one single component, and/or one component may be configured using multiple sub-components to achieve the desired functionalities. Some components of the server 1100 may be configured using hardware elements, software elements, firmware elements and/or a combination thereof.

The processor 1106 may be configured to extract programming instructions from the memory 1108 to provide various features for data processing. Further, two or more components may be embodied in one single component, and/or one component may be configured using multiple sub-components to achieve the desired functionalities. The connection engine 1110 may be a hardware component managing all the wired connections in the server 1100. Solid state drives 1112 may be maintained for an extended storage for the server 1100.

Further, the chassis 1104 may be configured to perform non-core parts of the computing processes in the server 1100. The power supply 1114 may be configured to deliver the power as AC current based on the requirement to various components of the server 1100. The networking engine 1116 may be a hardware component with external ports to which the communication interfaces such as communication interface 1120 and the blades such as blade server 1102 will connect. The cooling component 1118 may be configured to manage the temperature of the server 1100. The cooling component 1118 may be a fan or a liquid cooling system.

The server 1100 may generate a plurality of server logs including server fault codes associated with the blade server 1102 and/or chassis 1104. These server logs may be utilized to learn the patterns of the faults happening in the server 1100 and predict future server log faults that may happen, as shown in the disclosure and the numeric time-series data generated by the server 1100 such as voltage, temperature, disk space, CPU usage, etc., may be utilized to predict time of occurrence of the next server failure, as shown in the disclosure.

The disclosed method with reference to FIG. 9, or one or more operations of the anomaly time prediction system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the anomaly time prediction system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, comprising:
    accessing, by a processor, a plurality of server logs and a stream of numeric time-series data associated with a server for a particular time window;
    applying, by the processor, a density machine learning model over the plurality of server logs for obtaining a first output, the density machine learning model trained based, at least in part, on normal log data associated with the server;
    applying, by the processor, a sequential machine learning model over the plurality of server logs for obtaining a second output, the sequential machine learning model trained based, at least in part, on the normal log data associated with the server;
    applying, by the processor, a stochastic recurrent neural network model over the stream of the numeric time-series data for obtaining a third output, the stochastic recurrent neural network model trained based, at least in part, on normal time-series data associated with the server;
    aggregating, by the processor, the first, second, and third outputs corresponding to the density machine learning model, the sequential machine learning model, and the stochastic recurrent neural network model based, at least in part, on an ensemble model;
    predicting, by the processor, a likelihood of at least one future server anomaly based, at least in part, on the aggregating; and
    determining, by the processor, a time of occurrence of the at least one future server anomaly by capturing server behavior characteristics using a time-series network model, the server behavior characteristics comprising time-series patterns of the stream of numeric time-series data within the particular time window.

2. The computer-implemented method as claimed in claim 1, further comprising:
    receiving, by the processor, the plurality of server logs and the stream of numeric time-series data from the server, each server log comprising server fault code and server severity rating, and the stream of numeric time-series data representing performance metrics associated with the server recorded within the particular time window; and
    performing, by the processor, data pre-processing over the plurality of server logs for converting the plurality of server logs into corresponding vector representations.

3. The computer-implemented method as claimed in claim 1, wherein the density machine learning model is implemented using a stacked auto encoder, and the sequential machine learning model is implemented using a Long Short Term Memory (LSTM) based sequential auto encoder.

4. The computer-implemented method as claimed in claim 1, wherein applying the density machine learning model over the plurality of server logs for obtaining the first output comprises:
providing, by the processor, an input vector associated with the plurality of server logs to the density machine learning model, a value for each index of the input vector representing a frequency of occurrences of each server fault code associated with a server log of the plurality of server logs within the particular time window.

5. The computer-implemented method as claimed in claim 1, wherein applying the stochastic recurrent neural network model over the stream of the numeric time-series data for obtaining the third output comprises:
determining, by the processor, temporal dependency between the stream of numeric time-series data by generating hidden variables corresponding to the stream of numeric time-series data;
mapping, by the processor, the stream of numeric time-series data to stochastic variables in a latent space; and
generating, by the processor, a probability distribution of the stochastic variables in the latent space.

6. The computer-implemented method as claimed in claim 5, further comprising:
reconstructing, by the processor, the stream of numeric time-series data based, at least in part, on the probability distribution of the stochastic variables in the latent space;
determining, by the processor, whether the stream of numeric time-series data occurred within the particular time window has anomalous behavior or not based, at least in part, on the reconstructing; and
generating, by the processor, the third output based, at least in part, on the determining whether the stream of numeric time-series data occurred within the particular time window has anomalous behavior or not.

7. The computer-implemented method as claimed in claim 1, wherein the time-series network model is implemented using a convolutional neural network layer, a recurrent neural network layer, and an autoregressive layer.

8. The computer-implemented method as claimed in claim 1, wherein the time-series network model is trained based, at least in part, on abnormal time-series data associated with the server.

9. The computer-implemented method as claimed in claim 1, further comprising:
sending, by the processor, an alert to an administrator about the time of occurrence of the at least one future server anomaly.

10. An anomaly time prediction system, comprising:
a communication interface;
a memory comprising executable instructions; and
a processor communicably coupled to the communication interface, the processor configured to execute the executable instructions to cause the anomaly time prediction system to at least:
access a plurality of server logs and a stream of numeric time-series data associated with a server for a particular time window,
apply a density machine learning model over the plurality of server logs for obtaining a first output, the density machine learning model trained based, at least in part, on normal log data associated with the server,
apply a sequential machine learning model over the plurality of server logs for obtaining a second output, the sequential machine learning model trained based, at least in part, on the normal log data associated with the server,
apply a stochastic recurrent neural network model over the stream of the numeric time-series data for obtaining a third output, the stochastic recurrent neural network model trained based, at least in part, on normal time-series data associated with the server,
aggregate the first, second, and third outputs corresponding to the density machine learning model, the sequential machine learning model, and the stochastic recurrent neural network model based, at least in part, on an ensemble model, predict a likelihood of at least one future server anomaly based, at least in part, on the aggregation, and
determine a time of occurrence of the at least one future server anomaly by capturing server behavior characteristics using a time-series network model, the server behavior characteristics comprising time-series patterns of the stream of numeric time-series data.

11. The anomaly time prediction system as claimed in claim 10, wherein the anomaly time prediction system is further caused to:
receive the plurality of server logs and the stream of numeric time-series data from the server, each server log comprising server fault code and server severity rating, and the stream of numeric time-series data representing performance metrics associated with the server recorded within the particular time window; and
perform data pre-processing over the plurality of server logs for converting the plurality of server logs into corresponding vector representations.

12. The anomaly time prediction system as claimed in claim 10, wherein the density machine learning model is implemented using a stacked auto encoder, and wherein the sequential machine learning model is implemented using a Long Short Term Memory (LSTM) based sequential auto encoder.

13. The anomaly time prediction system as claimed in claim 10, wherein to apply the density machine learning model over the plurality of server logs for obtaining the first output, the anomaly time prediction system is further caused to:
provide an input vector associated with the plurality of server logs to the density machine learning model, a value for each index of the input vector representing a frequency of occurrences of each server fault code associated with a server log of the plurality of server logs within the particular time window.

14. The anomaly time prediction system as claimed in claim 10, wherein network architecture of the stochastic recurrent neural network model comprises gated recurrent units, variational auto encoder, and a planar normalizing flows (NF) architecture.

15. The anomaly time prediction system as claimed in claim 14, wherein to apply the stochastic recurrent neural network model over the stream of the numeric time-series data for obtaining the third output, the anomaly time prediction system is further caused to:
determine temporal dependency between the stream of numeric time-series data using the gated recurrent units by generating hidden variables corresponding to the stream of numeric time-series data, map the stream of numeric time-series data to stochastic variables in a latent space using the variational auto encoder, and generate a probability distribution of the stochastic variables in the latent space using the planar NF architecture.

16. The anomaly time prediction system as claimed in claim 15, wherein the anomaly time prediction system is further caused to:

reconstruct the stream of numeric time-series data based, at least in part, on the probability distribution of the stochastic variables in the latent space, determine whether the stream of numeric time-series data occurred within the particular time window has anomalous behavior or not based, at least in part, on the reconstruction, and generate the third output based, at least in part, on the determination of whether the stream of numeric time-series data occurred within the particular time window has anomalous behavior or not.

17. The anomaly time prediction system as claimed in claim 10, wherein the time-series network model is trained based, at least in part, on abnormal time-series data associated with the server, and wherein the time-series network model is implemented using a convolutional neural network layer, a recurrent neural network layer, and an autoregressive layer.

18. A computer-implemented method for predicting time of server failure, the computer-implemented comprising:

accessing, by a processor, a plurality of server logs and a stream of numeric time-series data associated with a server for a particular time window, the stream of numeric time-series data representing performance metrics associated with the server recorded within the particular time window;

applying, by the processor, a density machine learning model over the plurality of server logs for obtaining a first output, the density machine learning model trained based, at least in part, on normal log data associated with the server;

applying, by the processor, a sequential machine learning model over the plurality of server logs for obtaining a second output, the sequential machine learning model trained based, at least in part, on the normal log data associated with the server;

applying, by the processor, a stochastic recurrent neural network model over the stream of the numeric time-series data for obtaining a third output, the stochastic recurrent neural network model trained based, at least in part, on normal time-series data associated with the server;

aggregating, by the processor, the first, second, and third outputs corresponding to the density machine learning model, the sequential machine learning model, and the stochastic recurrent neural network model based, at least in part, on an ensemble model;

predicting, by the processor, a likelihood of at least one future server anomaly based, at least in part, on the aggregating; and determining, by the processor, a time of occurrence of the at least one future server anomaly by capturing server behavior characteristics using a time-series network model, the time-series network model trained based, at least in part, on abnormal time-series data associated with the server, the server behavior characteristics comprising time-series patterns of the stream of numeric time-series data within the particular time window.

19. The computer-implemented method as claimed in claim 18, wherein the density machine learning model is implemented using a stacked auto encoder, and the sequential machine learning model is implemented using a Long Short Term Memory (LSTM) based sequential auto encoder.

20. The computer-implemented method as claimed in claim 18, wherein the time-series network model is implemented using a convolutional neural network layer, a recurrent neural network layer, and an autoregressive layer.

* * * * *